United States Patent
Shimizu

(10) Patent No.: US 10,817,980 B2
(45) Date of Patent: Oct. 27, 2020

(54) INFORMATION PROCESSING APPARATUS, INFORMATION PROCESSING SYSTEM, DATA GENERATION METHOD, AND RECORDING MEDIUM STORING PROGRAM CODE

(71) Applicant: Ricoh Company, Ltd., Tokyo (JP)

(72) Inventor: Keitaro Shimizu, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/237,790

(22) Filed: Jan. 2, 2019

(65) Prior Publication Data
US 2019/0244326 A1    Aug. 8, 2019

(30) Foreign Application Priority Data

Feb. 7, 2018  (JP) ................................. 2018-020318
Oct. 30, 2018  (JP) ................................. 2018-203385

(51) Int. Cl.
*G06T 3/00* (2006.01)
*H04N 5/232* (2006.01)
*H04R 1/32* (2006.01)
*H04R 3/00* (2006.01)

(52) U.S. Cl.
CPC ....... *G06T 3/0062* (2013.01); *H04N 5/23238* (2013.01); *H04R 1/326* (2013.01); *H04R 3/005* (2013.01)

(58) Field of Classification Search
CPC .. G06T 3/0062; H04N 5/23238; H04R 1/326; H04R 3/005

USPC ............................................................ 348/36
See application file for complete search history.

(56) References Cited

U.S. PATENT DOCUMENTS

| | | | |
|---|---|---|---|
| 2017/0244884 A1* | 8/2017 | Burtey et al. ...... | H04N 5/23203 348/36 |
| 2018/0150989 A1 | 5/2018 | Mitsui et al. | |
| 2018/0152636 A1* | 5/2018 | Yim et al. ......... | H04N 5/23238 348/36 |

(Continued)

FOREIGN PATENT DOCUMENTS

| | | |
|---|---|---|
| JP | 2015-018013 | 1/2015 |
| JP | 2015-220745 | 12/2015 |

*Primary Examiner* — Nguyen T Truong
(74) *Attorney, Agent, or Firm* — Xsensus LLP

(57) ABSTRACT

An information processing apparatus, an information processing system, a data generation method, and a recording medium storing program code. The information processing apparatus and data generation method include displaying a spherical image obtained by an imaging apparatus, reproducing three-dimensional audio data obtained by the imaging apparatus in association with the spherical image, accepting designation of a displaying direction on the spherical image, generating two-dimensional image data that corresponds to the displaying direction, based on data of the spherical image, and generating two-dimensional audio data that corresponds to the displaying direction, from the three-dimensional audio data. The information processing system includes the information processing, and an image processing server connected to the information processing apparatus through a communication network. The image processing server generates two-dimensional audio data that corresponds to the displaying direction, based on the three-dimensional audio data.

8 Claims, 28 Drawing Sheets

(56) References Cited

U.S. PATENT DOCUMENTS

2018/0227665 A1* 8/2018 Elko et al. ............. H04R 1/406
  381/92

* cited by examiner

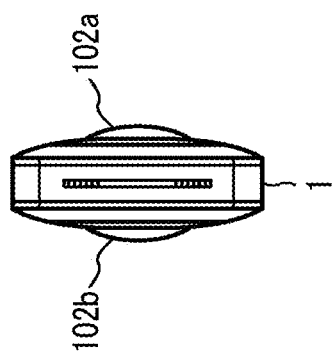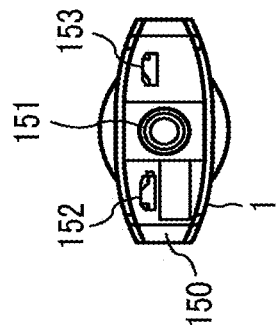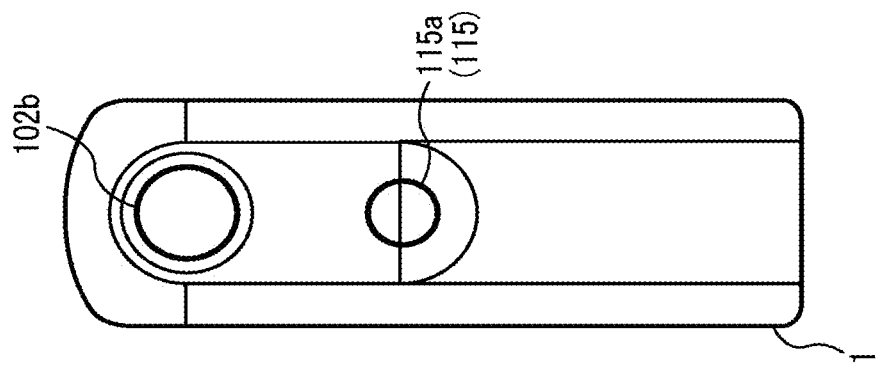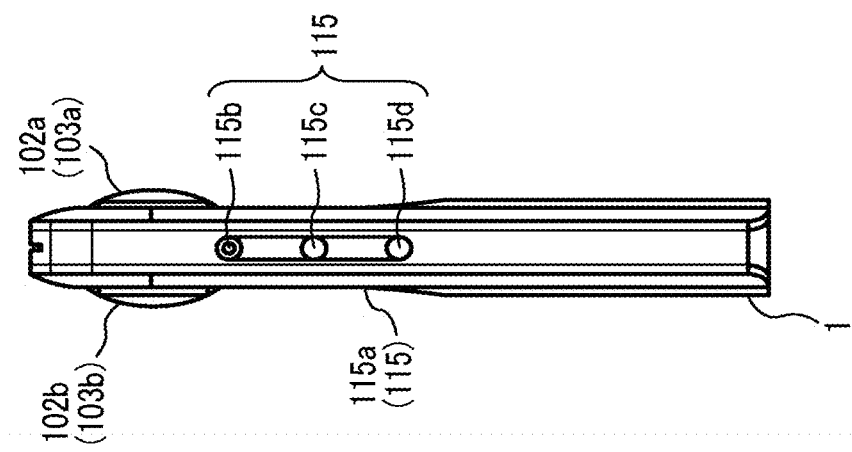

FIG. 3A
FIG. 3B
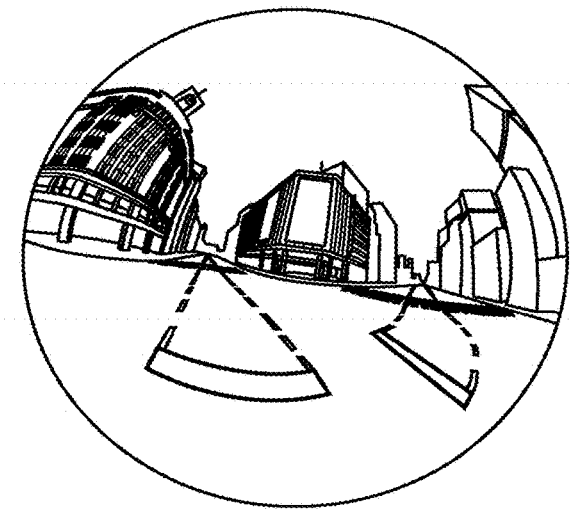
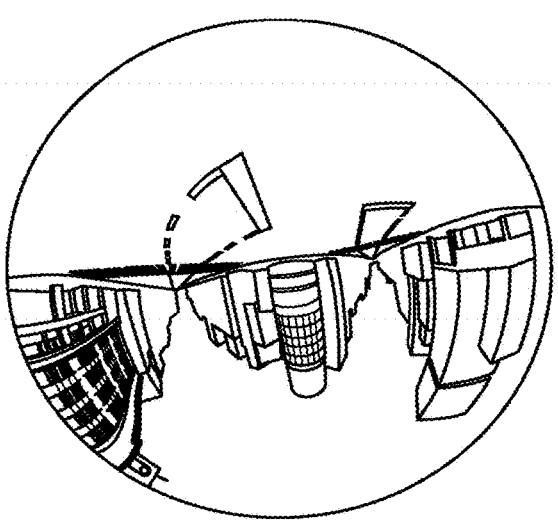
FIG. 3C
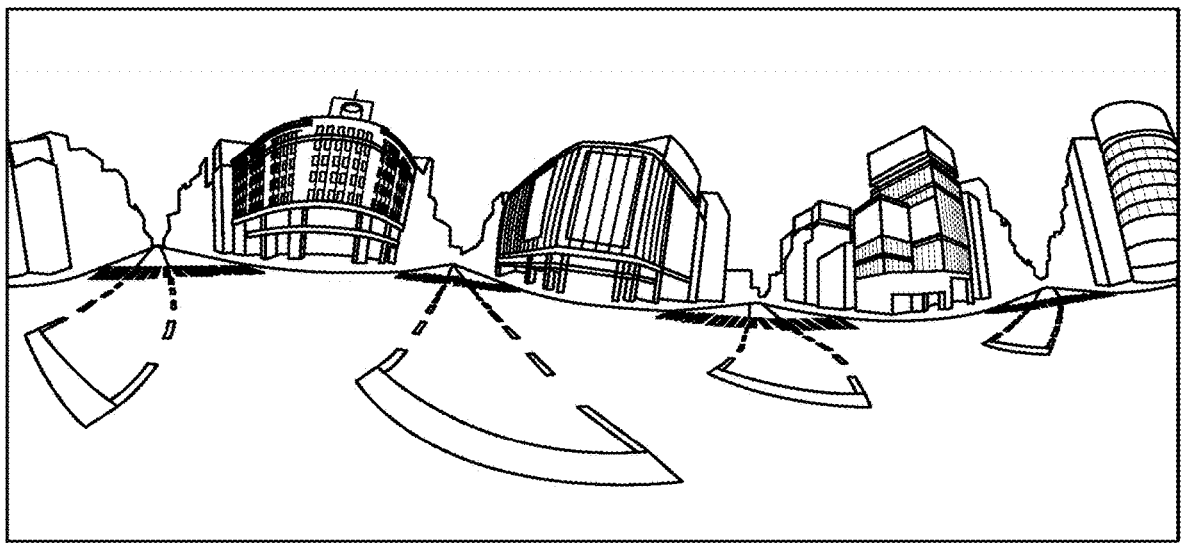

FIG. 12

| SPHERICAL IMAGE DATA | TILT ANGLE DATA | AUDIO DATA (CH1) | AUDIO DATA (CH2) | AUDIO DATA (CH3) | AUDIO DATA (CH4) | THREE-DIMENSIONAL AUDIO DATA | ... |
|---|---|---|---|---|---|---|---|
| SPHERICAL IMAGE DATA | TILT ANGLE DATA | AUDIO DATA (CH1) | AUDIO DATA (CH2) | AUDIO DATA (CH3) | AUDIO DATA (CH4) | THREE-DIMENSIONAL AUDIO DATA | ... |
| SPHERICAL IMAGE DATA | TILT ANGLE DATA | AUDIO DATA (CH1) | AUDIO DATA (CH2) | AUDIO DATA (CH3) | AUDIO DATA (CH4) | THREE-DIMENSIONAL AUDIO DATA | ... |
| SPHERICAL IMAGE DATA | TILT ANGLE DATA | AUDIO DATA (CH1) | AUDIO DATA (CH2) | AUDIO DATA (CH3) | AUDIO DATA (CH4) | THREE-DIMENSIONAL AUDIO DATA | ... |

200, 210, 250, 220, 230

→ TIME

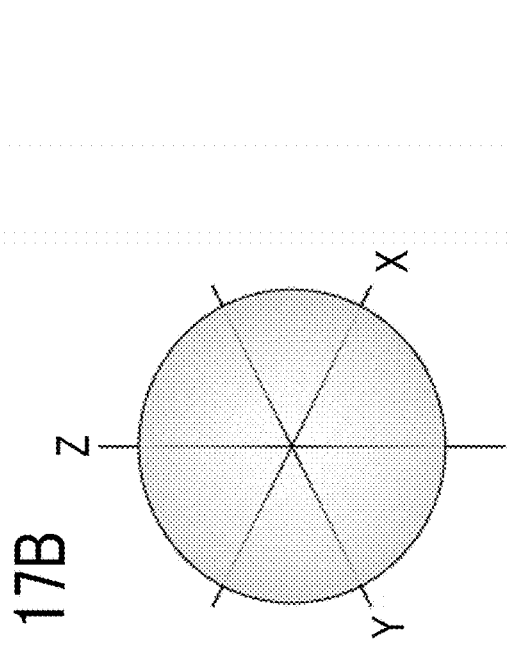
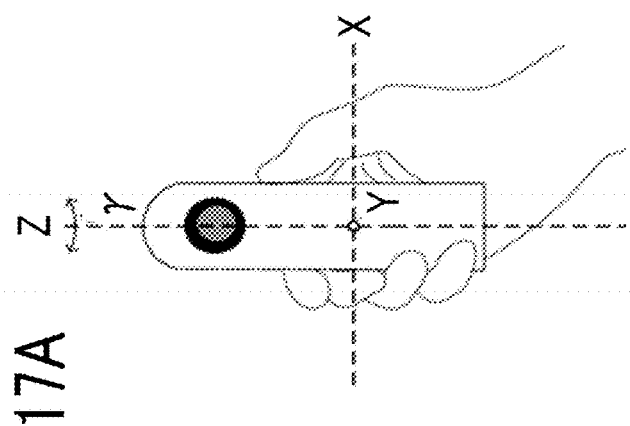
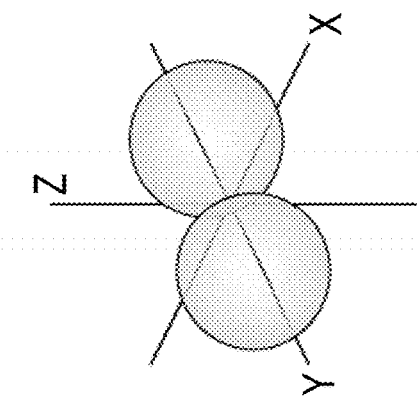
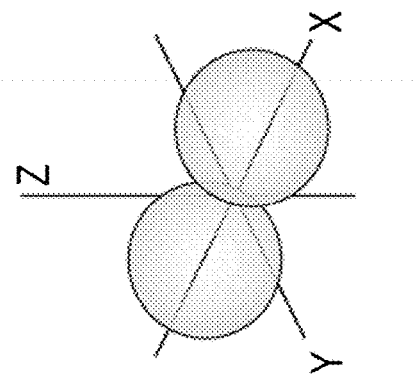
FIG. 17A  FIG. 17B  FIG. 17C  FIG. 17D  FIG. 17E

| ANGLE OF VIEW α (HORIZONTAL DIRECTION) | DEPTH z | ANGLE θs IN DISPLAY-AREA DIRECTION | RANGE TO BE CROPPED IN X-AXIS (-1 TO 1) | RANGE TO BE CROPPED IN Y-AXIS (-1 TO 1) | CENTER COORDINATES C(X, Y) IN RANGE TO BE CROPPED |
|---|---|---|---|---|---|
| 120° | 0.5 | 0° | Min ; -0.45 Max ; 0.95 | Min ; -0.20 Max ; 0.20 | (0.25, 0) |

| $\theta$ | $\theta_0$ ($\theta_s + \theta$) | $\theta_1$ ($\theta_0 - 45°$) | $\theta_2$ ($\theta_0 + 45°$) | $\theta_L$ | $\theta_R$ |
|---|---|---|---|---|---|
| 22.5° | 22.5° | −22.5° | 67.5° | 22.5° | 292.5° |

INFORMATION PROCESSING APPARATUS, INFORMATION PROCESSING SYSTEM, DATA GENERATION METHOD, AND RECORDING MEDIUM STORING PROGRAM CODE

CROSS-REFERENCE TO RELATED APPLICATIONS

This patent application is based on and claims priority pursuant to 35 U.S.C. § 119(a) to Japanese Patent Application Nos. 2018-020318 and 2018-203385, filed on Feb. 7, 2018, and Oct. 30, 2018, respectively, in the Japan Patent Office, the entire disclosures of which are hereby incorporated by reference herein.

BACKGROUND

Technical Field

Embodiments of the present disclosure relate to an information processing apparatus, an information processing system, a data generation method, and a recording medium storing program code.

Background Art

Currently, special digital cameras are known in the art that can capture a 360° omnidirectional panoramic image in a one-time photo shooting. In addition to still images, such digital cameras can record omnidirectional video with stereophonic sound (three-dimensional audio data).

For example, a configuration is known in the art in which the stereophonic sound that corresponds to the display range of the video data is reproduced and output from the stereophonic voice data that corresponds to the omnidirectional video data recorded by an omnidirectional camera.

A user can view and listen to plain video same as the video recorded by any known digital camera by playing two-dimensional video, which is a part of the omnidirectional video, on an information processing apparatus such as a smartphone.

SUMMARY

Embodiments of the present disclosure described herein provide an information processing apparatus, an information processing system, a data generation method, and a recording medium storing program code. The information processing apparatus and data generation method include displaying a spherical image obtained by an imaging apparatus, reproducing three-dimensional audio data obtained by the imaging apparatus in association with the spherical image, accepting designation of a displaying direction on the spherical image, generating two-dimensional image data that corresponds to the displaying direction, based on data of the spherical image, and generating two-dimensional audio data that corresponds to the displaying direction, from the three-dimensional audio data. The information processing system includes the information processing, and an image processing server connected to the information processing apparatus through a communication network. The information processing apparatus accepts designation of a displaying direction on the spherical image, and transmits the three-dimensional audio data and direction information indicating the displaying direction to the image processing server. The image processing server generates two-dimensional audio data that corresponds to the displaying direction, based on the three-dimensional audio data.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 1A is a diagram illustrating a left side view of an imaging apparatus according to an embodiment of the present disclosure.

FIG. 1B is a diagram illustrating a rear view of an imaging apparatus according to an embodiment of the present disclosure.

FIG. 1C is a diagram illustrating a plan view of an imaging apparatus according to an embodiment of the present disclosure.

FIG. 1D is a diagram illustrating a bottom view of an imaging apparatus according to an embodiment of the present disclosure.

FIG. 3A is a diagram illustrating a hemispheric image (front side) captured by an imaging apparatus, according to an embodiment of the present disclosure.

FIG. 3B is a diagram illustrating a hemispheric image (rear side) captured by an imaging apparatus, according to an embodiment of the present disclosure.

FIG. 3C is a diagram illustrating an image drawn by the equidistant cylindrical projection, according to an embodiment of the present disclosure.

FIG. 12 is a diagram illustrating recorded data according to the first embodiment of the present disclosure.

FIG. 17A, FIG. 17B, FIG. 17C, FIG. 17D, and FIG. 17E are diagrams each illustrating the coordinate axes of three-dimensional audio data, according to an embodiment of the present disclosure.

Figure 2:
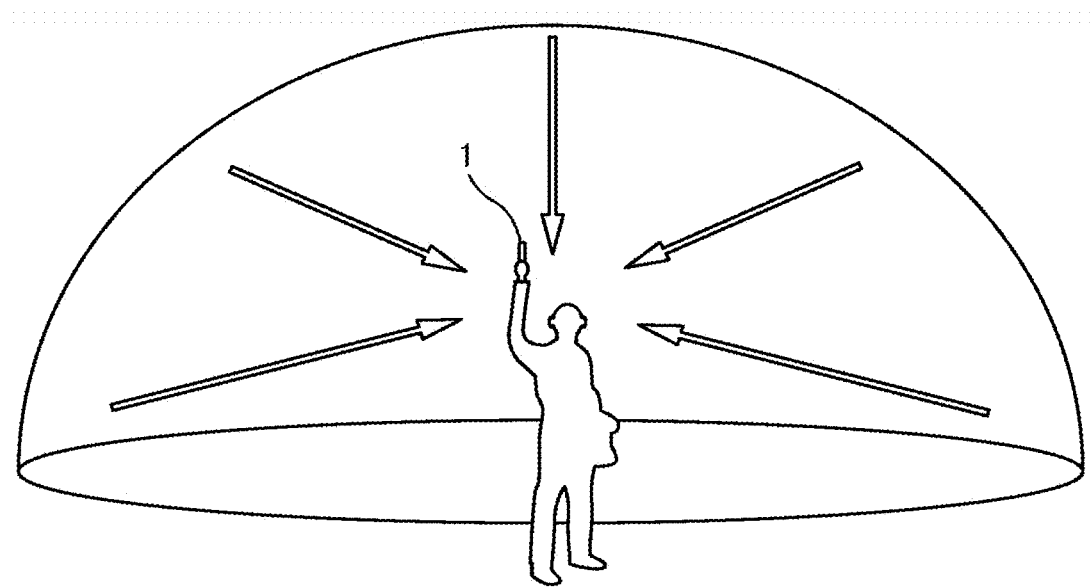
FIG. 2 is a diagram illustrating a picture of how an imaging apparatus is used, according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present disclosure are described below with reference to the accompanying drawings. In the description of the drawings, like reference signs denote like elements, and overlapping descriptions are omitted.

Outline of Embodiments

An outline of the embodiments of the present disclosure is described below. Firstly, a method of generating an omnidirectional image (spherical image) is described with reference to FIG. 1 to FIG. 7.

First, an external appearance of an imaging apparatus 1 is described with reference to FIG. 1A, FIG. 1B, FIG. 1C, and FIG. 1D. The imaging apparatus 1 is a digital camera used to obtain a captured image that later forms an omnidirectional (360°) panoramic image.

FIG. 1A is a diagram illustrating a left side view of the imaging apparatus 1 according to the present embodiment.

FIG. 1B is a diagram illustrating a rear view of the imaging apparatus 1 according to the present embodiment.

FIG. 1C is a diagram illustrating a plan view of the imaging apparatus 1 according to the present embodiment.

FIG. 1D is a diagram illustrating a bottom view of the imaging apparatus 1 according to the present embodiment.

As illustrated in FIG. 1A, FIG. 1B, FIG. 1C, and FIG. 1D, a fish-eye lens 102a and a fish-eye lens 102b are disposed on the front side and the rear side, respectively, on the upper side of the imaging apparatus 1. Inside the imaging apparatus 1, imaging devices (image sensors) 103a and 103b, as will be described later in detail, are disposed. The imaging apparatus 1 captures an object or scene through each of the fish-eye lenses 102a and 102b. Due to this configuration, a hemispheric image (whose angle of view is equal to or wider than 180°) can be obtained. A shutter release button 115a is arranged on the other side of the front side of the imaging apparatus 1. Moreover, a power switch 115b, a wireless fidelity (Wi-Fi) (registered trademark) key 115c, and a capturing-mode switching key 115d are arranged on a side of the imaging apparatus 1. Both the power switch 115b and the Wi-Fi key 115c are switched on and off every time these power switch 115b and Wi-Fi key 115c are touched or pressed down. The capturing-mode switching key 115d is switched between a still-image capturing mode and a moving-image capturing mode every time the capturing-mode switching key 115d is touched or pressed down. Note that each of the shutter release button 115a, the power switch 115b, the Wi-Fi key 115c, and the capturing-mode switching key 115d is a part of the operating part 115. However, no limitation is intended thereby, and the operating part 115 may be other kinds of keys or buttons.

A tripod threaded hole 151, which is used to attach the imaging apparatus 1 to a tripod for cameras, is arranged in the center of the bottom 150 of the imaging apparatus 1. Moreover, a micro universal serial bus (USB) (registered trademark) terminal 152 is arranged on the left side of the bottom 150. and, a high-definition multimedia interface (HDMI) (registered trademark) terminal 153 is arranged on the right side of the bottom 150.

A situation in which the imaging apparatus 1 is used is described below with reference to FIG. 2.

FIG. 2 is a diagram illustrating a picture of how the imaging apparatus 1 is used, according to the present embodiment.

As illustrated in FIG. 2, for example, the imaging apparatus 1 is held by hand, and is used to capture an object existing around the user. In this configuration, an object existing around the user is captured by each of the imaging devices 103a and 103b as illustrated in FIG. 1. As a result, two hemispheric images can be obtained.

Next, processes in which an equidistant cylindrical projection image EC and a spherical image CE are generated from the images captured by the imaging apparatus 1 are schematically described with reference to FIG. 3A, FIG. 3B, FIG. 3C, FIG. 4A, and FIG. 4B.

FIG. 3A is a diagram illustrating a hemispheric image (front side) captured by the imaging apparatus 1, according to the present embodiment.

FIG. 3B is a diagram illustrating a hemispheric image (rear side) captured by the imaging apparatus 1, according to the present embodiment.

FIG. 3C is a diagram illustrating an image drawn by the equidistant cylindrical projection, according to the present embodiment (such an image may be referred to as an equidistant cylindrical projection image in the following description).

Figure 4B:
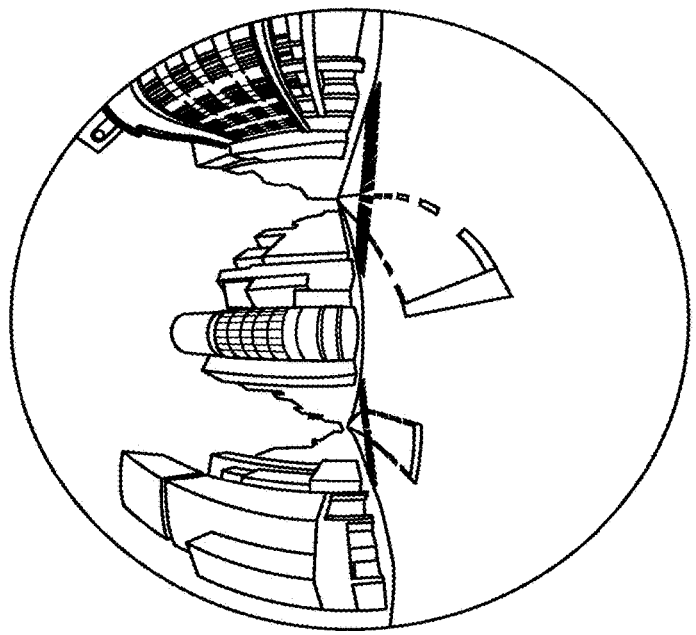
FIG. 4B is a diagram illustrating a spherical image according to an embodiment of the present disclosure.
Figure 4A:
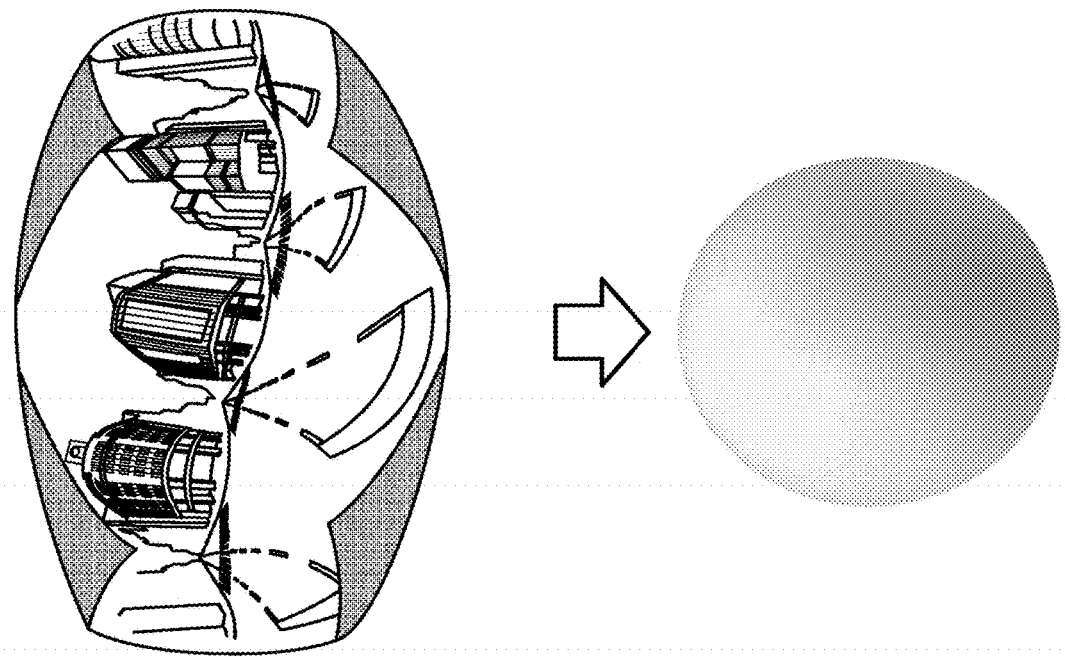
FIG. 4A is a diagram illustrating how an equidistant cylindrical projection image covers a sphere, according to an embodiment of the present disclosure.

FIG. 4A is a diagram illustrating how an equidistant cylindrical projection image covers a sphere, according to the present embodiment.

FIG. 4B is a diagram illustrating a spherical image according to the present embodiment.

As illustrated in FIG. 3A, an image obtained by the imaging device 103a is a hemispheric image (front side) that is bent by the fish-eye lens 102a. In a similar manner, as illustrated in FIG. 3B, an image obtained by the imaging device 103b is a hemispheric image (rear side) that is bent by the fish-eye lens 102b. The imaging apparatus 1 combines the hemispheric image (front side) and the hemispheric image (rear side) that is inverted by 180 degrees, to generate an equidistant cylindrical projection image EC as illustrated in FIG. 3C.

The imaging apparatus 1 adopts the open graphics library for embedded systems (OpenGL ES), and pastes the equidistant cylindrical projection image EC so as to cover the spherical surface as illustrated in FIG. 4A. Accordingly, a spherical image CE is generated as illustrated in FIG. 4B. As described above, the spherical image CE is represented as an image where the equidistant cylindrical projection image EC faces the center of the sphere. The OpenGL ES is a graphics library used to visualize two-dimensional (2D) or three-dimensional (3D) data. The spherical image CE may be either of a still image or moving images.

As described above, the spherical image CE is an image pasted so as to cover a spherical surface. For this reason, human feels awkward when he or she views such an image. In order to handle such a situation, the imaging apparatus 1 controls a particular display device to display a predetermined area of the spherical image CE (such an image may be referred to as a predetermined-area image in the following description) as a planar image with little bending. Due to this configuration, an image can be displayed in such a manner that a human does not feel awkward. Its mechanism and method are described below with reference to FIG. 5, FIG. 6A, and FIG. 6B.

Figure 5:
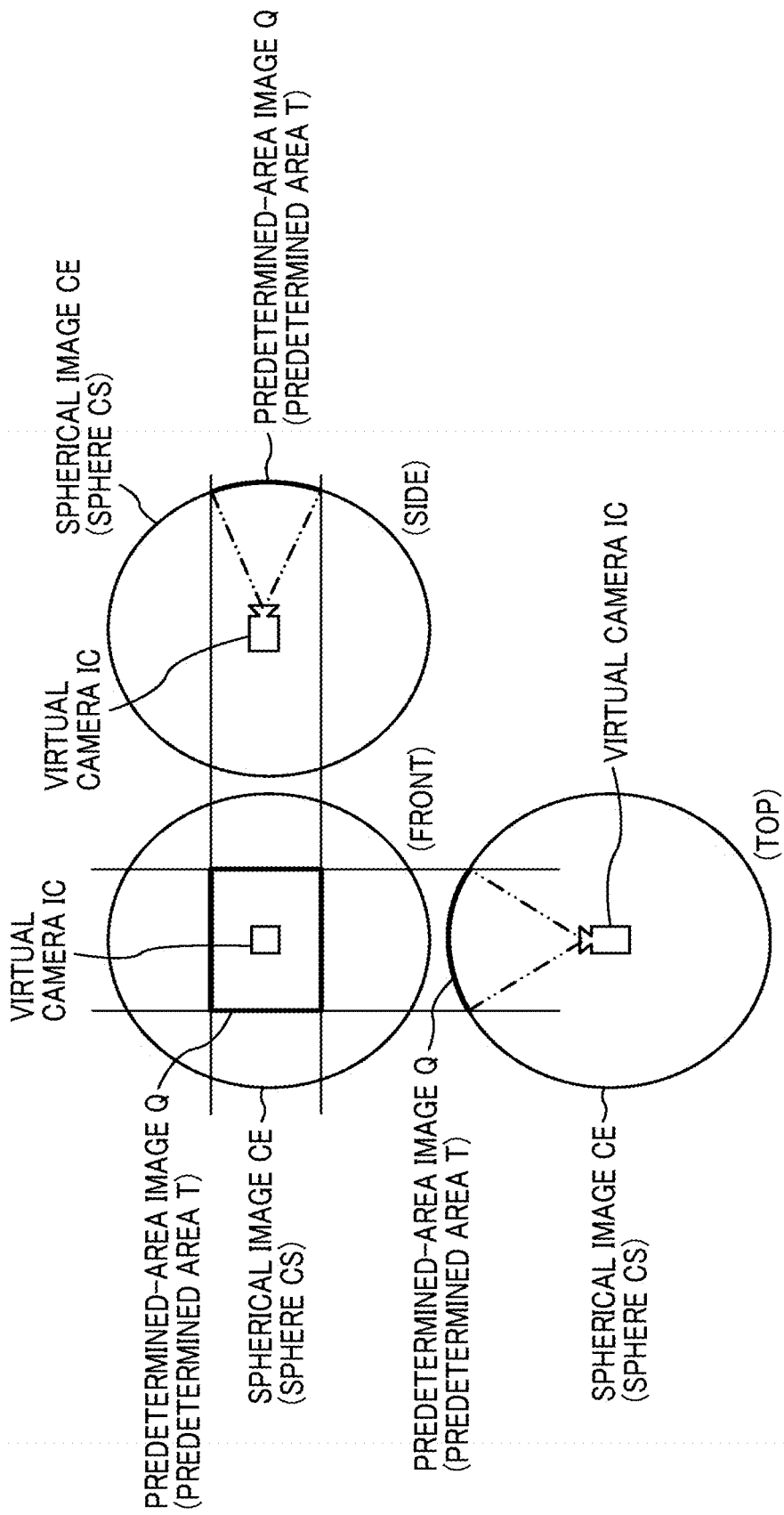
FIG. 5 is a diagram illustrating the positions of a virtual camera and a predetermined area when it is assumed that a spherical image is a three-dimensional sphere, according to an embodiment of the present disclosure.

FIG. 5 is a diagram illustrating the positions of a virtual camera IC and a predetermined area T when it is assumed that a spherical image is a three-dimensional sphere, according to the present embodiment.

The virtual camera IC indicates the location of the eye-point of a user who sees the spherical image CE that is displayed as a three-dimensional sphere.

Figure 6A:
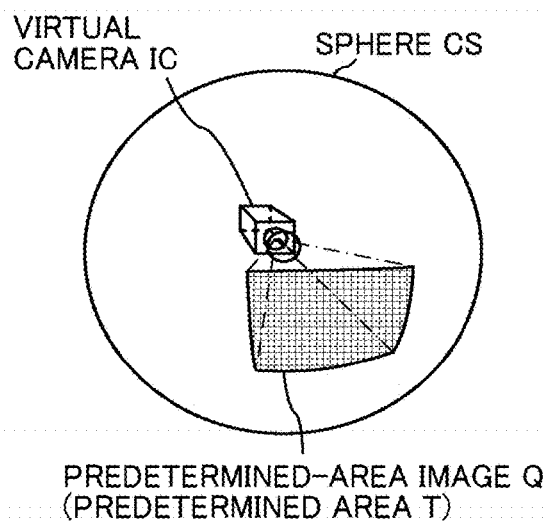
FIG. 6A is a three-dimensional perspective view of the three-dimensional sphere of FIG. 5.

FIG. 6A is a three-dimensional perspective view of the three-dimensional sphere of FIG. 5.

Figure 6B:
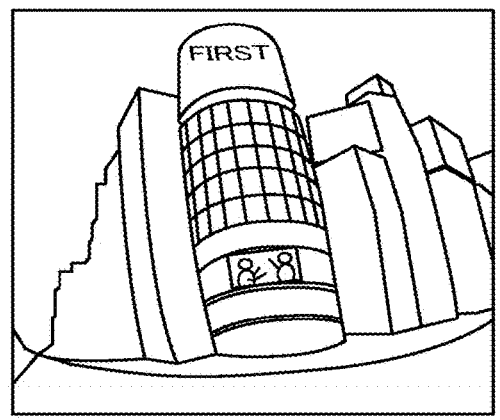
FIG. 6B is a diagram illustrating a state in which the image of a predetermined area is displayed on the display of a communication terminal, according to an embodiment of the present disclosure.

FIG. 6B is a diagram illustrating a state in which a predetermined-area image Q is displayed on the display of the communication terminal 5, according to the present embodiment.

In FIG. 6A, the spherical image CE as illustrated in FIG. 4B is expressed as a three-dimensional sphere CS. When it is assumed that the spherical image CE as generated above is the sphere CS, as illustrated in FIG. 5, the virtual camera IC is placed inside the spherical image CE. The predetermined area T in the spherical image CE is a capturing range of the virtual camera IC, and is determined by the predetermined-area information indicating the capturing direction and the angles of view of the virtual camera IC in the three-dimensional virtual space including the spherical image CE.

Then, as illustrated in FIG. 6B, a predetermined-area image Q as illustrated in FIG. 6A is displayed on a particular display device as the image in the capturing range of the virtual camera IC. The image as illustrated in FIG. 6B is an image of the predetermined area indicated by the predetermined-area information in the initial settings (default). Further description is given below with reference to the capturing directions (ea, aa) of the virtual camera IC and the angle of view ($\alpha$).

The relation between predetermined-area information and the image in the predetermined region T is described below with reference to FIG. 7.

Figure 7:
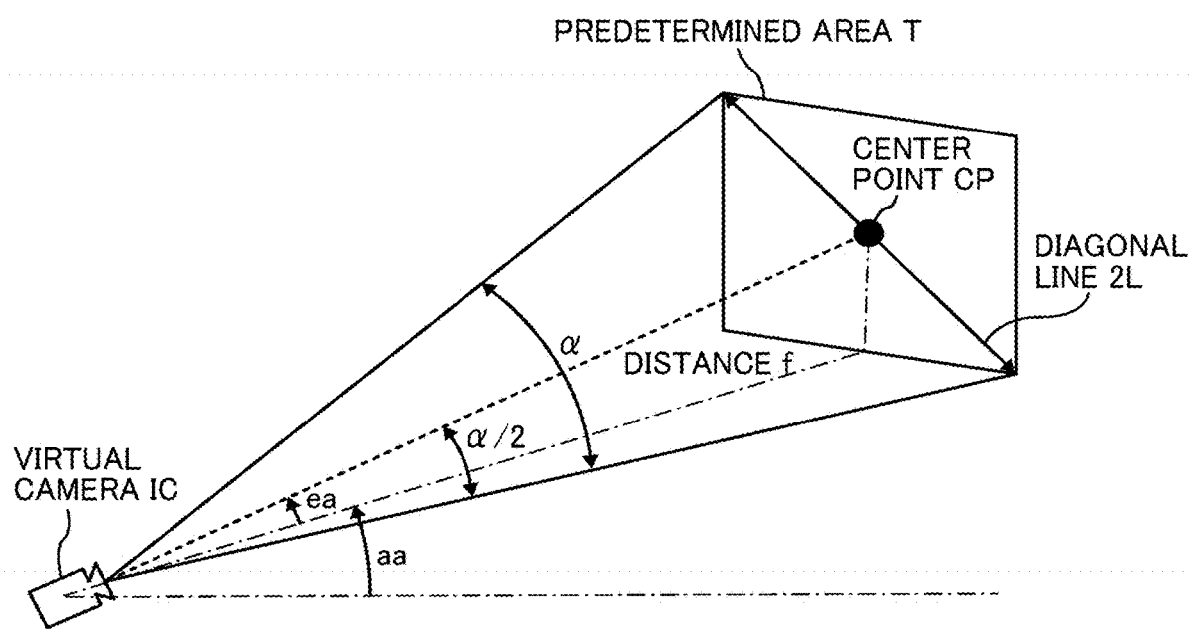
FIG. 7 is a diagram illustrating the relation between predetermined-area information and the image in a predetermined region T, according to an embodiment of the present disclosure.

FIG. 7 is a diagram illustrating the relation between predetermined-area information and the image in the predetermined region T, according to the present embodiment.

The reference signs "ea", "aa", and "$\alpha$" in FIG. 7 denote the elevation angle, the azimuth angle, and angle of view, respectively. In other words, the attitude of the virtual camera IC is changed such that the observation point of the virtual camera IC indicated by the capturing directions (ea, aa) matches the center point CP of a predetermined area T that is a capturing range of the virtual camera IC. The predetermined-area image Q is the image in the predetermined area T of the spherical image CE. "f" denotes the distance between the virtual camera IC and the center point CP. "L" denotes the distance between the center point CP and any of the vertices of the predetermined area T (2L indicates a diagonal line). As known in the art, a trigonometric function expressed as in Formula 1 given below is valid in FIG. 7.

$$L/f=\tan(\alpha/2) \qquad \text{Formula 1}$$

First Embodiment

A first embodiments of the present disclosure is described below with reference to FIG. 8 to FIG. 25. In the following description, an example case in which video data is recorded by the imaging apparatus 1 will be described. However, no limitation is indicated thereby, and the same goes for cases in which a still image is captured by the imaging apparatus 1. In such cases, audio data of about several seconds that is associated with the still image captured by the imaging apparatus 1 is also obtained.

System Configuration

Firstly, a schematic configuration of the information processing system according to the present embodiment is described with reference to FIG. 8.

Figure 8:
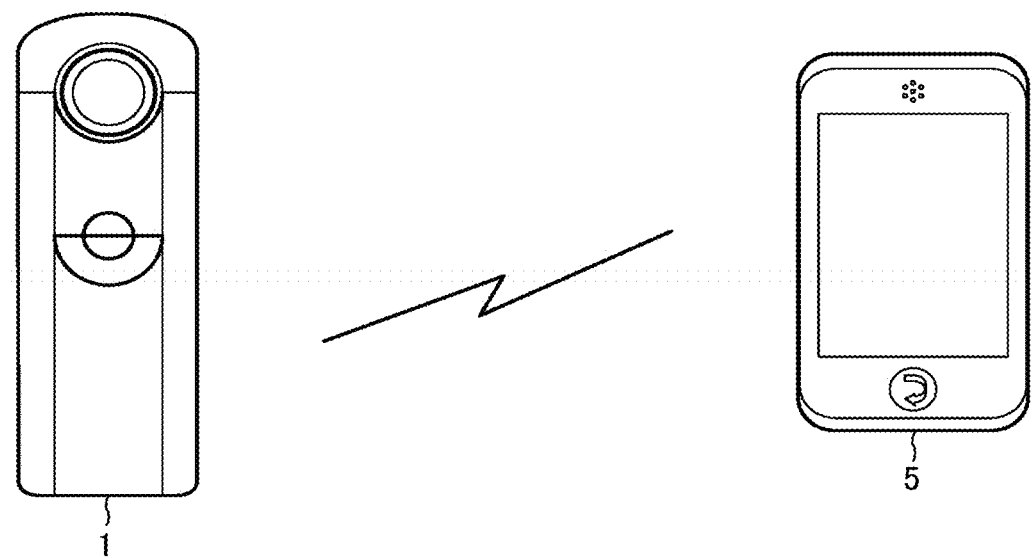
FIG. 8 is a diagram illustrating a system configuration of an information processing system according to a first embodiment of the present disclosure.

FIG. 8 is a diagram illustrating a system configuration of the information processing system according to the first embodiment of the present disclosure.

When a certain area of the spherical image captured by the imaging apparatus 1 is to be displayed on the communication terminal 5 as a two-dimensional image, the information processing system as illustrated in FIG. 8 can generate the two-dimensional audio data that is associated with the two-dimensional image data.

As illustrated in FIG. 8, the information processing system according to the first embodiment are configured by the imaging apparatus 1 and the communication terminal 5. As described above, the imaging apparatus 1 is a special-purpose digital camera that captures, for example, an object and a scenery to obtain a pair of hemispheric images that later form an omnidirectional (panoramic) image.

For example, the communication terminal 5 is a smartphone that can perform wireless communication with the imaging apparatus 1, using short-range radio communication technology such as wireless fidelity (Wi-Fi) (registered trademark), Bluetooth (registered trademark), and near-field communication (NFC). Moreover, the communication terminal 5 can display the image (that may be a still image or moving images) obtained from the imaging apparatus 1, on a display 517 of the communication terminal 5 as will be described later. The communication terminal 5 is an example of an information processing apparatus.

Alternatively, the communication terminal 5 may communicate with the imaging apparatus 1 through a wired connection such as a cable, without using the short-range radio communication technology. Further, the communication terminal 5 may be, for example, a tablet personal computer (PC), a laptop PC, or a desktop PC, instead of being a smartphone.

Hardware Configuration

A hardware configuration of the imaging apparatus 1 and the communication terminal 5 according to the first embodiments of the present disclosure is described below with reference to FIG. 9 and FIG. 10. The hardware configuration illustrated in FIG. 9 and FIG. 10 may be adopted in common among the embodiments of the present disclosure. Alternatively, some components or elements may be added to or deleted from the hardware configuration of FIG. 9 and FIG. 10.

Hardware Configuration of Imaging Apparatus

Firstly, a hardware configuration of the imaging apparatus 1 is described below with reference to FIG. 9.

Figure 9:
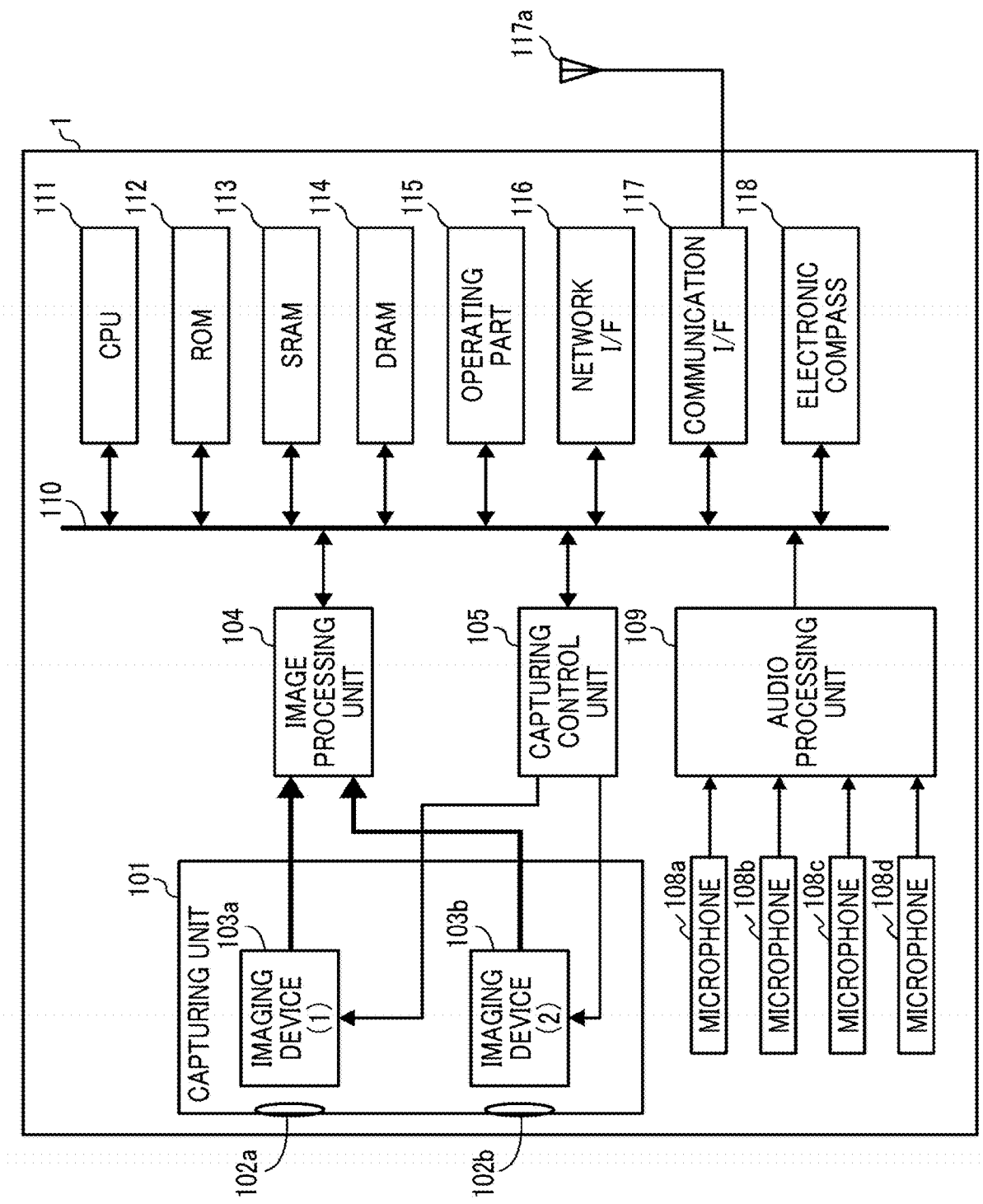
FIG. 9 is a diagram illustrating a hardware configuration of an imaging apparatus according to the first embodiment of the present disclosure.

FIG. 9 is a diagram illustrating a hardware configuration of the imaging apparatus 1 according to the first embodiment of the present disclosure.

In the following description, the imaging apparatus 1 is described as a spherical (omnidirectional) image recording apparatus with a pair of imaging devices. However, no limitation is indicated thereby, and the number of imaging devices may be any number equal to or greater than two. It is not always necessary for the imaging apparatus 1 to be an apparatus dedicated to record omnidirectional images or video. For example, an omnidirectional imaging unit may be retrofitted to any known digital camera or smartphone so as to substantially achieve the same functions as the imaging apparatus 1.

The imaging apparatus 1 includes a capturing unit 101, an image processing unit 104, a capturing control unit 105, microphones 108a to 108d, an audio processing unit 109, a central processing unit (CPU) 111, a read only memory (ROM) 112, a static random access memory (SRAM) 113, a dynamic random access memory (DRAM) 114, an operating part 115, a network interface (I/F) 116, a communication interface (I/F) 117, an antenna 117a, and an electronic compass 118.

Among those elements, the capturing unit 101 is provided with wide-angle lenses (so-called fish-eye lenses) 102a and 102b each of which has an angles of view equal to or wider than 180° and forms a hemispheric image, and a pair of imaging devices 103a and 103b that are assigned to those wide-angle lenses 102a and 102b, respectively. For example, the imaging device 103a and 103b are provided with an image sensor such as a complementary metal oxide semiconductor (CMOS) sensor and a charge coupled device (CCD) sensor, which converts the optical images by fish-eye lenses 102a and 102b into image data of electrical signals and output the obtained image data, a timing generating circuit that generates, for example, a horizontal synchronizing signal or vertical synchronizing signal of the image sensor and a pixel clock signal of the image sensor, and a group of registers in which, for example, various kinds of commands or parameters for operating these imaging devices 103a and 103b are set.

Each of the imaging device 103a and 103b is coupled to the image processing unit 104 through a parallel interface (I/F) bus. Moreover, each of the imaging device 103a and 103b is coupled to the capturing control unit 105 through a serial interface (I/F) such as an inter-integrated circuit (I2C) bus. The image processing unit 104, the capturing control unit 105, and the audio processing unit 109 are coupled to the CPU 111 through the bus 110. Further, the bus 110 is coupled to, for example, the ROM 112, the SRAM 113, the DRAM 114, the operating part 115, the network interface 116, the communication interface 117, and the electronic compass 118.

The image processing unit 104 takes in the image data output from the imaging devices 103a and 103b through the parallel interface bus. Then, the image processing unit 104 performs predetermined processing on each item of the image data, and then combines these items of image data. As a result, the data of an equidistant cylindrical projection image is generated as illustrated in FIG. 3C.

As known in the art, the capturing control unit 105 uses the I2C bus to set, for example, commands to the group of registers of the imaging devices 103a and 103b, where the capturing control unit 105 serves as a master device and the imaging devices 103a and 103b serve as a pair of slave devices. These commands or the like set herein are received from the CPU 111. In a similar manner, the capturing control unit 105 uses the I2C bus to take in, for example, the status data of the group of registers of the imaging devices 103a and 103b, and sends the obtained data to the CPU 111.

The capturing control unit 105 instructs the imaging devices 103a and 103b to output image data at the timing when the shutter button of the operating part 115 is touched or pressed down. The imaging apparatus 1 may have a function to display a preview by a display device (such as the display 517 of the communication terminal 5) or a function to deal with the display of a still image or the playback of moving images. In the case of moving images, the image data is continuously output from the imaging devices 103a and 103b at a predetermined frame rate (frames/minute).

As will be described later in detail, the capturing control unit 105 may also serve as a synchronous control unit that synchronizes the timing at which the image data is output from the imaging device 103a with the timing at which the image data is output from the imaging device 103b, in cooperation with the CPU 111. In the present embodiment, the imaging apparatus 1 is not provided with a display. However, no limitation is indicated thereby, and the imaging apparatus 1 may be provided with a display unit.

Each of the microphones 108a to 108d picks up the sound from the surrounding environment of the imaging apparatus 1, and converts the picked-up sound into audio (signal) data. The audio processing unit 109 takes in the audio data output from each of the microphones 108a to 108d through the interface bus, and performs a predetermined type of processing on the obtained audio data. The four microphones 108a to 108d have specific arrangement, and may collectively be referred to as the microphones 108 in the following description. It is desired that each of the microphones 108a to 108d be an Ambisonics microphone. In the present embodiment, each of the microphones 108a to 108d serves as a sound collector that picks up the sound from the surrounding environment.

FIG. 2 illustrates a case in which the microphones 108 are built into the imaging apparatus 1.

However, no limitation is indicated thereby, and the microphones 108 may externally be attached to the imaging apparatus 1. Note also that the number of the microphones 108 is not limited to four.

The CPU 111 controls the entire operation of the imaging apparatus 1, and performs other processes as necessary. The ROM 112 stores various kinds of programs for the CPU 111. Each of the SRAM 113 and the DRAM 114 serves as working memory, and stores, for example, a program to be executed by the CPU 111 and the data that is being processed. In particular, the DRAM 114 stores the image data that is being processed by the image processing unit 104 or the data of equidistant cylindrical projection image that has been processed.

Operation keys such as the shutter release button 115a are collectively be referred to as the operating part 115. For example, a user can specify various kinds of capturing modes or input various kinds of capturing conditions by operating the operating part 115.

Interface circuits (e.g., a universal serial bus (USB) interface) with an external medium such as secure digital (SD) card or an external device such as a personal computer (PC) are collectively be referred to as the network interface 116. The network interface 116 may be a wireless or wired interface. The data of an equidistant cylindrical projection image stored in the DRAM 114 may be stored in an external medium through the network interface 116, or may be transmitted to an external device such as the communication terminal 5 on an as-needed basis through the network interface 116.

The communication interface 117 adopts the short-range radio communication technology such as the wireless fidelity (Wi-Fi) (registered trademark), the near-field communication (NFC), and the Bluetooth (registered trademark), and communicates with an external device such as the communication terminal 5 through the antenna 117a provided for the imaging apparatus 1. The communication interface 117 can transmit the data of an equidistant cylindrical projection image to an external device such as the communication terminal 5.

The electronic compass 118 calculates the orientation of the imaging apparatus 1 based on the earth's magnetism, and outputs the orientation information or direction information. The orientation information or direction information is an example of association information (metadata) that is consistent with the exchangeable image file format (Exif), and is used for image processing such as image compensation or image correction to be performed on the captured image. Note also that the association information includes items of data including the shooting date and time of a captured image and the data size of the image data.

Hardware Configuration of Communication Terminal

A hardware configuration of the communication terminal 5 is described below with reference to FIG. 10.

Figure 10:
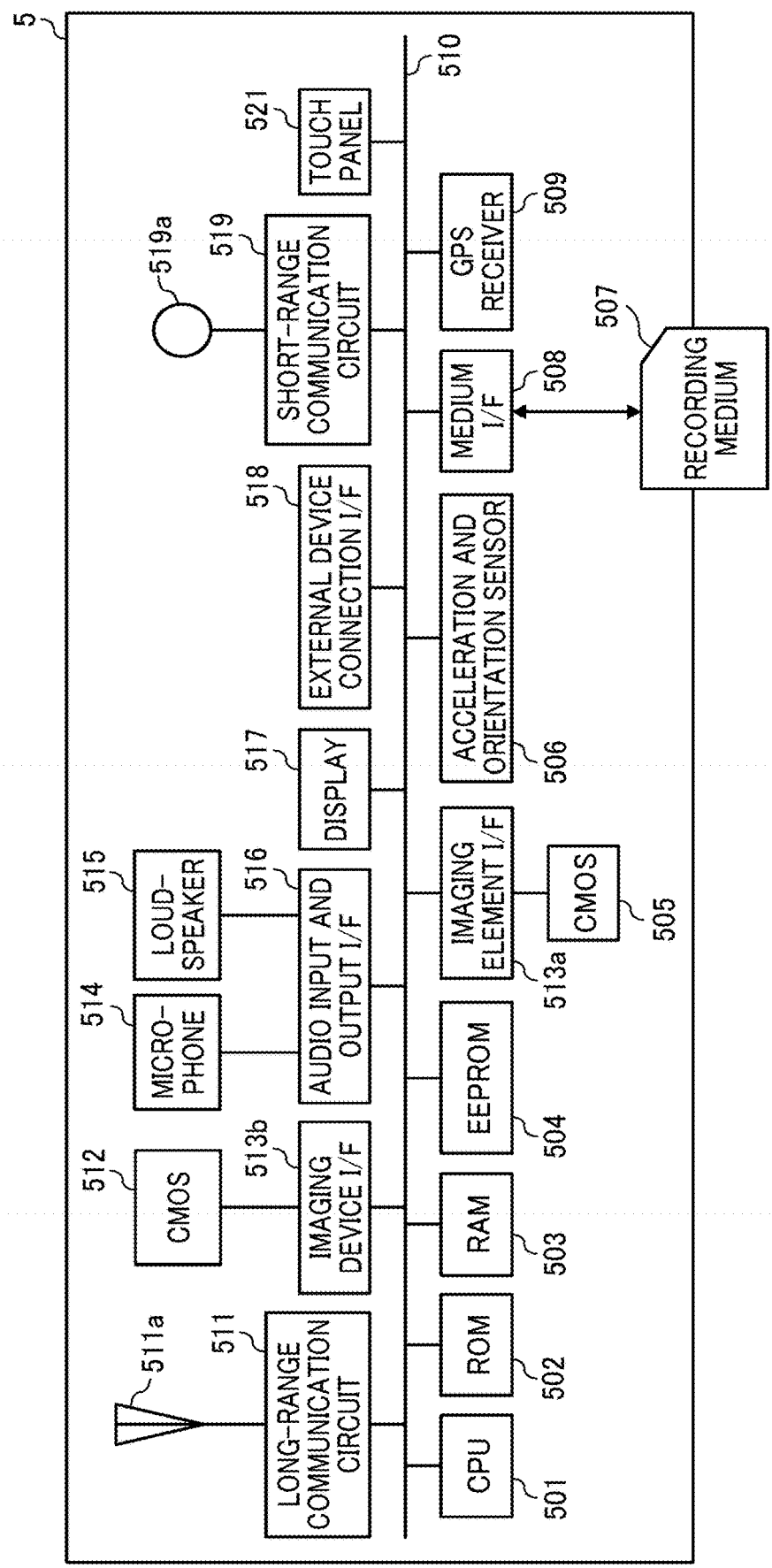
FIG. 10 is a diagram illustrating a hardware configuration of a communication terminal according to the first embodiment of the present disclosure.

FIG. 10 is a diagram illustrating a hardware configuration of the communication terminal 5 according to the first embodiment of the present disclosure.

The communication terminal 5 is provided with a CPU 501, a ROM 502, a RAM 503, an electrically erasable programmable read-only memory (EEPROM) 504, a complementary metal oxide semiconductor (CMOS) sensor 505, an imaging device interface (I/F) 513a, an acceleration and orientation sensor 506, a medium interface (I/F) 508, and a global positioning system (GPS) receiver 509.

The CPU 501 controls the overall operation of the communication terminal 5. The ROM 502 stores a control program such as an initial program loader (IPL) used for operating the CPU 501. The RAM 503 is used as a work area for the CPU 501. The EEPROM 504 reads or writes various kinds of data such as a communication terminal control program under control of the CPU 501.

The CMOS sensor 505 captures an object (a self-portrait) under the control of the CPU 501 to obtain captured image data. The imaging device interface 513a is a circuit that controls the operation of the CMOS sensor 512. The acceleration and orientation sensor 506 includes various kinds of sensors such as an electromagnetic compass or gyrocompass for detecting geomagnetism and an acceleration sensor. The medium interface 508 controls reading or writing of data to or from a recording medium 507 such as a flash memory. The GPS receiver 509 receives a global positioning system (GPS) signal from a GPS satellite.

Moreover, the communication terminal 5 is provided with a long-range communication circuit 511, an antenna 511a, a complementary metal oxide semiconductor (CMOS) sensor 512, an imaging device interface (I/F) 513b, a microphone 514, a loudspeaker 515, an audio input and output interface (I/F) 516, a display 517, an external device connection interface (I/F) 518, a short-range communication circuit 519, an antenna 519a for the short-range communication circuit 519, and a touch panel 521.

The long-range communication circuit 511 is a circuit that communicates with other devices through a communication network 100, as will be described later in detail. The CMOS sensor 512 is an example of a built-in imaging device that captures a subject under the control of the CPU 501 to obtain image data. The imaging device interface 513b is a circuit that controls the operation of the CMOS sensor 512. The microphone 514 is an example of a built-in sound collector capable of inputting audio under the control of the CPU 501. The audio input and output interface 516 is a circuit for controlling an input and output of an audio signal between the microphone 514 and the loudspeaker 515, under the control of the CPU 501.

The display 517 may be a liquid crystal or organic electro luminescence (EL) display that displays an image of a subject, various kinds of icons, or the like. The external device connection interface 518 is an interface circuit that connects the communication terminal 5 to various kinds of external devices. The short-range communication circuit 519 is a communication circuit that communicates in compliance with the wireless fidelity (Wi-Fi), the NFC (Registered Trademark), the Bluetooth (Registered Trademark), or the like. The touch panel 521 is an example of an input device to operate the communication terminal 5 by touching the screen of the display 517.

Moreover, the communication terminal 5 is provided with a bus line 510. The bus line 510 is, for example, an address bus or a data bus, which electrically connects the multiple elements such as the CPU 501 to each other.

A recording medium such as hard disk (HD) and a CD-ROM storing the programs as described above may be distributed domestically or internationally as a program product.

Functional Configuration

Subsequently, a functional configuration of the imaging apparatus 1 and the communication terminal 5 according to the first embodiment is described.

Figure 11:
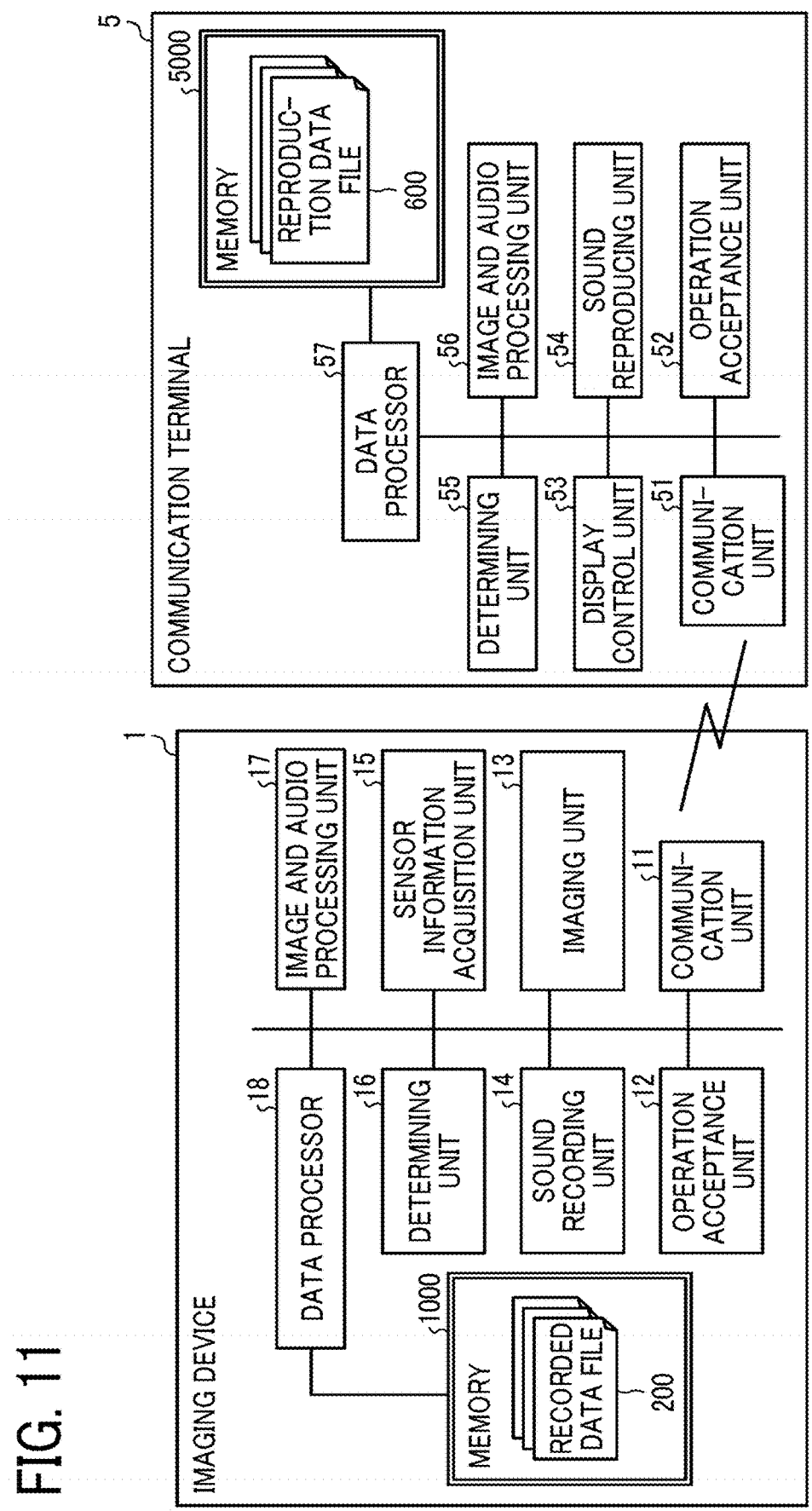
FIG. 11 is a diagram illustrating a functional configuration of an information processing system according to the first embodiment of the present disclosure.

FIG. 11 is a diagram illustrating a functional configuration of an information processing system according to the present embodiment.

Functional Configuration of Imaging Apparatus

A functional configuration of the imaging apparatus 1 is described below with reference to FIG. 11. The functions that are implemented by the imaging apparatus 1 include a communication unit 11, an operation acceptance unit 12, an imaging unit 13, a sound recording unit 14, a sensor information acquisition unit 15, a determining unit 16, an image and audio processing unit 17, a data processor 18, and a memory 1000.

The communication unit 11 is a function to communicate with an external device such as the communication terminal 5 by a short-range radio communication technology such as wireless fidelity (Wi-Fi) (registered trademark). The communication unit 11 is implemented mainly by operations of the CPU 111, the communication interface 117, and the antenna 117a as illustrated in FIG. 9.

The operation acceptance unit 12 is a function to receive various kinds of operation or input made by a user. The operation acceptance unit 12 is implemented mainly by operations of the CPU 111 and the operating part 115 as illustrated in FIG. 9.

The imaging unit 13 is a function to capture, for example, an object and a scenery image to obtain captured-image data. As illustrated in FIG. 3A and FIG. 3B, the captured-image data consists of two pieces of hemispheric image data that later form spherical image data. The captured-image data may include moving images in addition to still images. The imaging unit 13 is implemented mainly by operations of the CPU 111 as well as the capturing unit 101, the image processing unit 104, and the capturing control unit 105 as illustrated in FIG. 9.

The sound recording unit 14 is a function to picks up the sound around the imaging apparatus 1. The sound recording unit 14 is implemented mainly by operations of the CPU 111 as well as the microphone 108 and the audio processing unit 109 as illustrated in FIG. 9. The sound recording unit 14 obtains the audio data recorded using the multiple microphones 108a to 108d as illustrated in FIG. 9.

The sensor information acquisition unit 15 is a function to obtain sensor-detection result information such as the directions (including azimuth angle and magnetic north) from a sensor such as the electronic compass 118. The sensor-detection result information such as the measured directions indicates the posture or attitude of the imaging apparatus 1 at a predetermined point in time. The sensor information acquisition unit 15 is implemented mainly by operations of the CPU 111 and the electronic compass 118 as illustrated in FIG. 9.

The determining unit 16 is a function to perform various kinds of determination, and is implemented mainly by operations of the CPU 111 as illustrated in FIG. 9.

The image and audio processing unit 17 is a function to perform various kinds of processing on the captured-image data obtained by the imaging unit 13 or the audio data obtained by the sound recording unit 14. For example, the image and audio processing unit 17 generates the data of an equidistant cylindrical projection image as illustrated in FIG. 3C, based on the two pieces of hemispheric image data (see FIG. 3A and FIG. 3B) that are obtained by the pair of imaging devices 103a and 103b, respectively. Moreover, for example, the image and audio processing unit 17 generates the three-dimensional audio data 230 based on the audio data obtained by the sound recording unit 14. The image and audio processing unit 17 is implemented mainly by the instructions sent from the CPU 111 as illustrated in FIG. 9.

The data processor 18 performs processing to store various types of data in the memory 1000 or read various types of data stored in the memory 1000. The data processor 18 is implemented mainly by operations of the CPU 111 as illustrated in FIG. 9. The memory 1000 is implemented mainly by the ROM 112, the SRAM 113, and the DRAM 114 as illustrated in FIG. 9. The memory 1000 stores a recorded data file 200.

Recorded Data File

The data that is stored in the memory 1000 is described below in detail.

FIG. 12 is a diagram illustrating the data structure of recorded data file according to the first embodiment. The recorded data file 200 is a file in which the image data and audio data obtained by the imaging apparatus 1 by capturing an object are stored. The recorded data file 200 as depicted in FIG. 12 includes a channel for the spherical image data 210, a channel for the tilt angle data 250, channels for the audio data 220, and a channel for the three-dimensional audio data 230. In the recorded data file 200, items of data are stored on a channel-by-channel basis, where each channel serves as a transmission channel of the data stored inside the imaging apparatus 1. Due to this configuration, the spherical image data 210, the audio data 220, the three-dimensional audio data 230, and the tilt angle data 250 can be stored as a single file.

The spherical image data 210 is recorded in a Moving Picture Experts Group (MPEG) format which is one example of the moving-image formats, and is encoded in units called group of pictures (GOP). In the present embodiment, the term GOP refers to a unit of a group of frames including at least one reference frame (i.e., "I picture" in the MPEG format). For example, the spherical image data 210 is medium data in the MPEG4 advanced video coding (AVC)/H.264 format.

The audio data 220, the three-dimensional audio data 230, and the tilt angle data 250 are separately stored in different time divisions that correspond to the GOP format. The audio data 220, the three-dimensional audio data 230, and the tilt angle data 250 are associated with each other such that the times at which the audio data 220, the three-dimensional audio data 230, and the tilt angle data 250 are recorded are matched with reference to the time of start of record. Due to this configuration, the times elapsed since the time of start of record can be matched among the tilt angle data 250, the audio data 220, and the three-dimensional audio data 230.

The audio data 220 is generated based on the audio signals that are picked up by the multiple microphones 108a to 108d. The audio data 220 is recorded for each channel of the multiple microphones 108a to 108d. For example, the audio data 220 is generated based on the Ambisonics A-format, which will be described later in detail.

The three-dimensional audio data 230 is the stereophonic sound data generated based on the Ambisonics B-format as will be described later in detail. The three-dimensional audio data 230 is generated using the audio data 220 that is recorded for each channel of the multiple microphones 108a to 108d. A method of generating the three-dimensional audio data 230 will be described later in detail.

For example, the audio data 220 and the three-dimensional audio data 230 are recorded in an uncompressed audio format such as the advanced audio coding (AAC) low complexity (LC) format and the linear pulse code modulation (PCM) format. Alternatively, the audio data 220 and the three-dimensional audio data 230J may be recorded in a compressed audio format such as the Moving Picture Experts Group (MPEG) Audio Layer 3 (MP3) format. Note also that it is satisfactory as long as the recorded data file 200 includes at least one of the audio data 220 and the three-dimensional audio data 230. This is because, as described above, the three-dimensional audio data 230 is generated from the audio data 220. For example, when only the audio data 220 is stored, the three-dimensional audio data 230 may be generated from the audio data 220 as necessary. Due to this configuration, the amount of data can be reduced. When only the three-dimensional audio data 230 is stored, it is not necessary to generate the three-dimensional audio data 230 from the audio data 220. Accordingly, the amount of data can further be reduced.

The tilt angle data 250 is metadata including the attitude information of the imaging apparatus 1. The attitude information of the imaging apparatus 1 is the data that indicates the posture of the imaging apparatus 1 at a predetermined point in time. The tilt angle data 250 is described by triaxial data where the orientation of the imaging apparatus 1 on the coordinate system of an omnidirectional image (spherical image) is indicated by pitch, roll, and Yaw.

In the present embodiment, it is assumed that the spherical image data 210, the audio data 220, the three-dimensional audio data 230, and the tilt angle data 250 are stored as a single data file 200. However, no limitation is intended thereby, and those items of data may be stored as separate files. The recorded data file 200 may be regarded as a unit of frames, and the spherical image data 210, the audio data 220, the three-dimensional audio data 230, and the tilt angle data 250 may be associated with each other in the recorded data file 200.

Functional Configuration of Communication Terminal

A functional configuration of the communication terminal 5 is described below with reference to FIG. 11. The functions that are implemented by the communication terminal 5 include a communication unit 51, an operation acceptance unit 52, a display control unit 53, a sound reproducing unit 54, a determining unit 55, an image and audio processing unit 56, a data processor 57, and a memory 5000. The communication terminal 5 is installed with an application program dedicated to play back omnidirectional video. For example, as the CPU 501 executes an installed application program, the communication terminal 5 implements a data generation method according to an embodiment of the present disclosure.

The communication unit 51 is a function to communicate with an external device such as the imaging apparatus 1 by a short-range radio communication technology such as wireless fidelity (Wi-Fi) (registered trademark). The communication unit 51 is implemented mainly by operations of the CPU 501, the short-range communication circuit 519, and the antenna 519a as illustrated in FIG. 10.

The operation acceptance unit 52 is a function to receive various kinds of selection or input made by a user. The operation acceptance unit 52 is implemented mainly by operations of the CPU 501 and the touch panel 521 as illustrated in FIG. 10. The touch panel 521 may be the same element as the display 517. The operation acceptance unit 52 may be implemented by an input device other than the touch panel.

The display control unit 53 is a function to control the display 517 of the communication terminal 5 to display (reproduce) various kinds of picture. A method of displaying an image is not limited to any particular method. A spherical image may be displayed just as it is, or an image area that corresponds to a specific angle of view in the spherical image may be cropped and displayed. For example, the display control unit 53 plays back the cropped image data 610 that is generated by reproduction data generation unit 63. The display control unit 53 is implemented mainly by operations of the CPU 501 as illustrated in FIG. 10. The display control unit 53 is an example of a reproduction unit that plays back two-dimensional image data. The display control unit 53 is an example of a reproduction unit that plays back two-dimensional video.

The sound reproducing unit 54 is a function to control the loudspeaker 515 of the communication terminal 5 to play the audio data. The sound reproducing unit 54 plays the reproduction audio data 650 generated by the reproduction data generation unit 63. The sound reproducing unit 54 is implemented mainly by operations of the CPU 501 as illustrated in FIG. 10. The sound reproducing unit 54 is an example of a reproduction unit that plays two-dimensional audio data. The sound reproducing unit 54 is an example of a reproduction unit that plays back two-dimensional video.

The determining unit 55 is implemented mainly by operations of the CPU 501 as illustrated in FIG. 10, and makes various kinds of determination.

The image and audio processing unit 56 is a function to perform various kinds of processes of reproducing the spherical image data 210 and the audio data (for example, the three-dimensional audio data 230 or the reproduction audio data 650 as will be described later in detail), which are obtained from the imaging apparatus 1, on the communication terminal 5. The image and audio processing unit 56 is implemented mainly by the instructions sent from the CPU 501 as illustrated in FIG. 10.

The data processor 57 performs processing to store various types of data in the memory 5000 or read various types of data stored in the memory 5000. The data processor 57 is implemented mainly by operations of the CPU 501 as illustrated in FIG. 10. The memory 5000 is implemented mainly by the ROM 502, the EEPROM 504, and the recording medium 507 as illustrated in FIG. 10. The memory 5000 stores a reproduction data file 600, which will be described later in detail. The memory 5000 is an example of a storage unit.

Detailed Functional Configuration of Image and Audio Processing Unit

A functional configuration of the image and audio processing unit 56 is described below in detail with reference to FIG. 13.

Figure 13:
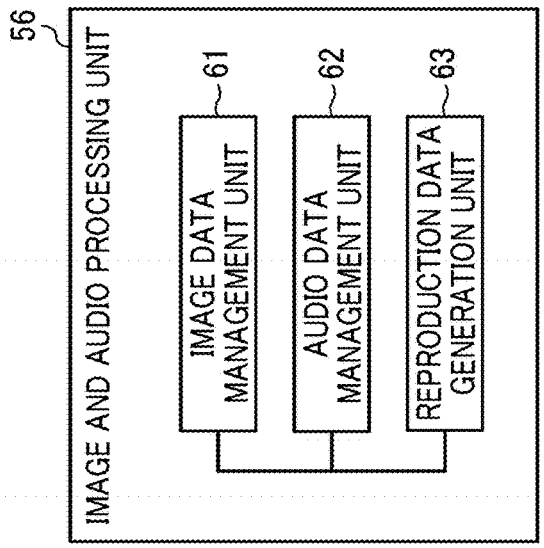
FIG. 13 is a diagram illustrating a detailed functional configuration of an image and audio processing unit according to the first embodiment of the present disclosure.

FIG. 13 is a diagram illustrating a detailed functional configuration of the image and audio processing unit 56 according to the first embodiment.

The image and audio processing unit 56 includes an image data management unit 61, an audio data management unit 62, and a reproduction data generation unit 63.

The image data management unit 61 is a function to manage, control, and maintain the display range of the spherical image data 210. For example, the image data management unit 61 specifies the position or displaying direction of the cropped image data 610 (an example of two-dimensional image data) included in the spherical image data 210, which is a specific area selected by a user of the communication terminal 5. For example, the position or displaying direction of the cropped image data 610 is the coordinates of the cropped image data 610. The image data management unit 61 is implemented mainly by operations of the CPU 501 as illustrated in FIG. 10. The image data management unit 61 is an example of a displaying direction specification unit.

The audio data management unit 62 is a function to manage, control, and maintain the reproduction audio data 650 that corresponds to the cropped image data 610. The audio data management unit 62 specified by the image data management unit 61 based on the position or displaying direction of the cropped image data 610 specifies the sound-source direction of the three-dimensional audio data 230. The audio data management unit 62 is implemented mainly by operations of the CPU 501 as illustrated in FIG. 10. The audio data management unit 62 is an example of a sound-source direction specification unit.

The reproduction data generation unit 63 is a function to generate the reproduction data file 600 using the recorded data file 200 received from the imaging apparatus 1. For example, the reproduction data generation unit 63 generates the cropped image data 610 from the spherical image data 210, and generates the reproduction audio data 650 based on the three-dimensional audio data 230. The reproduction data generation unit 63 is implemented mainly by operations of the CPU 501 as illustrated in FIG. 10. The reproduction data generation unit 63 is an example of a generation unit.

Reproduction Data File

The data that is stored in the memory 5000 is described below in detail.

Figure 14:
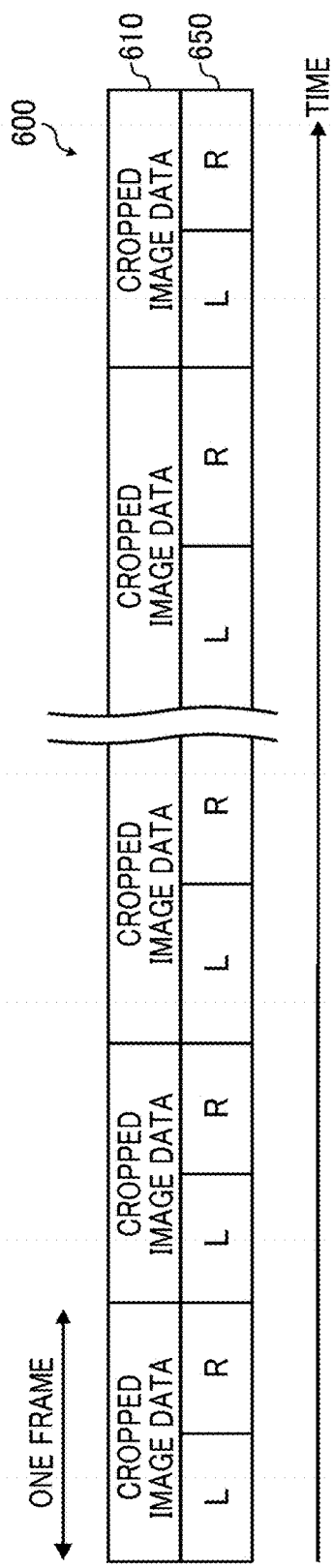
FIG. 14 is a diagram illustrating reproduction data according to the first embodiment of the present disclosure.

FIG. 14 is a diagram illustrating reproduction data according to the first embodiment.

The reproduction data file 600 as illustrated in FIG. 14 is medium data used to play back omnidirectional video as two-dimensional video on the communication terminal 5.

In the reproduction data file 600, the reproduction audio data 650 and the cropped image data 610 are associated with each other on a one-frame-by-one-frame basis. The cropped image data 610 is the image data that is cropped by a user from the spherical image displayed on the communication terminal 5. In the cropping process, a certain area that is a part of the spherical image data is extracted (cropped). The term "certain area" indicates a particular area of the spherical image data, which is selected by a user through a particular input operation. The cropped image data 610 is an example of two-dimensional image data.

The reproduction audio data 650 is the audio data that corresponds to the position of the cropped image data 610 in the spherical image data. The reproduction audio data 650 contains right and left (L and R) two channels of audio data. The reproduction audio data 650 is stereophonic audio data used for the stereophonic reproduction, which is generated by combining the above-described right and left (L and R) two channels of audio data. The reproduction audio data 650 is an example of two-dimensional audio data.

Storing Process of Recorded Data

Figure 15:
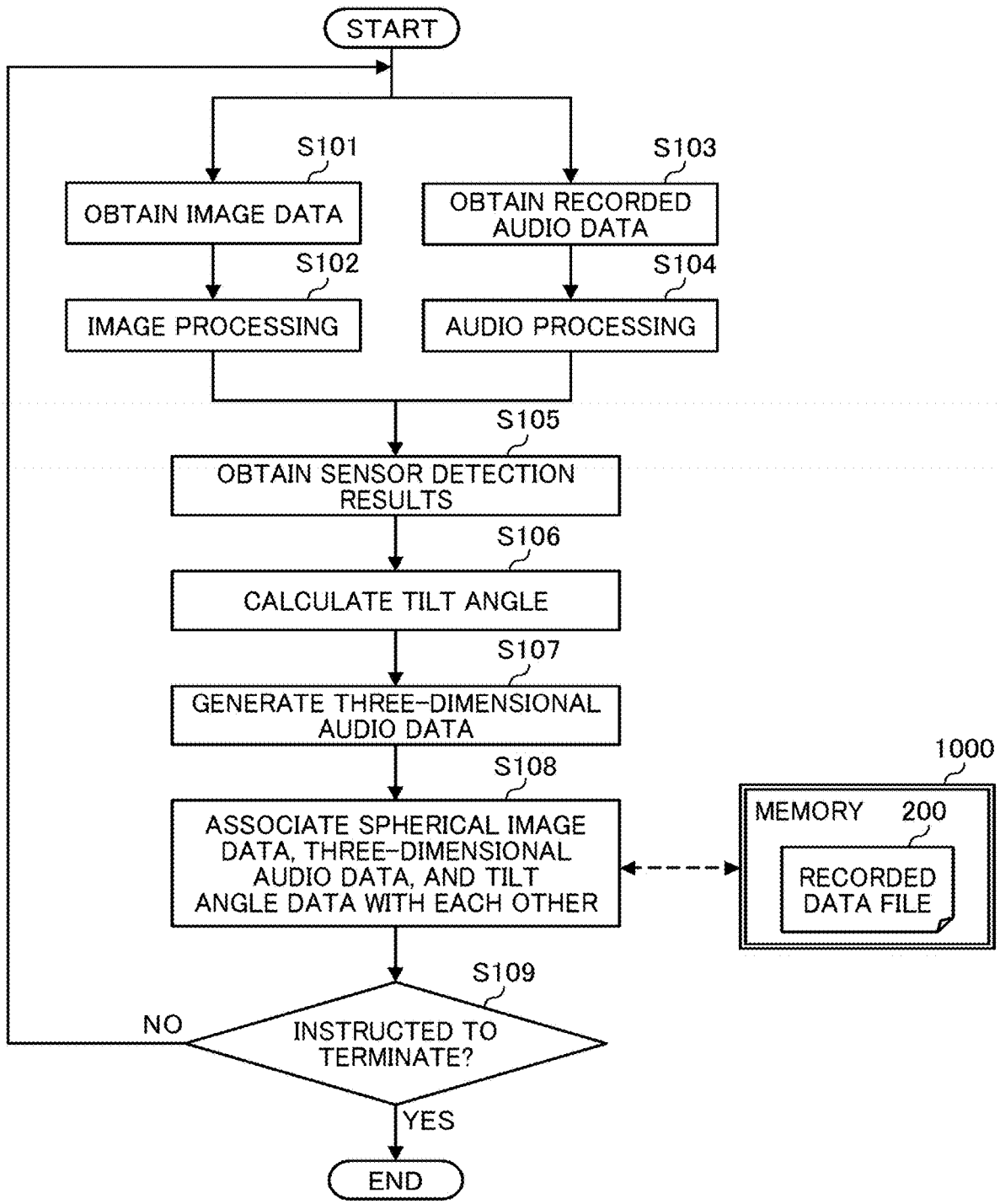
FIG. 15 is a flowchart of how recorded data is processed and stored in an imaging apparatus according to the first embodiment of the present disclosure.

FIG. 15 is a flowchart of how recorded data is processed and stored in the imaging apparatus 1 according to the first embodiment of the present disclosure.

For example, the processes as illustrated in FIG. 15 start in response to a particular operation to provide instructions to start recording, such as pressing down of the operating part 115 disposed on the housing of the imaging apparatus 1.

In a step S101, the imaging unit 13 of the imaging apparatus 1 obtains the image data captured using the imaging devices 103*a* and 103*b*. For example, the image data that is obtained by the imaging unit 13 include the two pieces of hemispheric image data as illustrated in FIG. 3A and FIG. 3B.

In a step S102, the image and audio processing unit 17 of the imaging apparatus 1 performs image processing on the image data obtained in the step S101. For example, the image and audio processing unit 17 generates the data of an equidistant cylindrical projection image as illustrated in FIG. 3C, based on the two pieces of hemispheric image data obtained in the step S101 (see FIG. 3A and FIG. 3B). In the present embodiment, it is assumed that the imaging apparatus 1 obtains image data and performs image processing on a group-of-frame-by-group-of-frame basis.

When the processes as depicted in FIG. 15 start, the imaging apparatus 1 performs the processes in a step S103 and a step S104 in parallel with the processes in the step S101 and the step S102.

In the step S103, the sound recording unit 14 of the imaging apparatus 1 obtains the recorded audio data that is recorded from each of the microphones 108*a* to 108*d* through the audio processing unit 109. In the step S104, the image and audio processing unit 17 of the imaging apparatus 1 performs audio processing on the recorded audio data obtained in the step S103. For example, the image and audio processing unit 17 uses the audio processing unit 109 to convert the recorded audio data that is recorded from each of the microphones 108*a* to 108*d* into the audio data 220 that is compatible with the Ambisonics A-format. In the imaging apparatus 1 according to the present embodiment, the recorded audio data in the time division corresponding to a unit of a group of frames is obtained and audio processing is performed thereon.

In a step S105, the sensor information acquisition unit 15 of the imaging apparatus 1 obtains from the electronic compass 118 the sensor-detection result information of when the image data and the audio data are recorded in the steps S101 and S103, respectively. In a step S106, the imaging apparatus 1 calculates and obtains the tilt angle and the orientation of the imaging apparatus 1 when the data is recorded, based on the sensor-detection result information obtained using the electronic compass 118.

In a step S107, the image and audio processing unit 17 of the imaging apparatus 1 generate the three-dimensional audio data 230 based on the audio data 220. A method of generating the three-dimensional audio data 230 will be described later in detail.

In a step S108, the data processor 18 of the imaging apparatus 1 associates the spherical image data 210, the three-dimensional audio data 230, and the tilt angle data 250 with each other, and controls the memory 1000 to store the associated data as the recorded data file 200. In the recorded data file 200, the spherical image data 210, the three-dimensional audio data 230, and the tilt angle data 250 in each group of frames are associated with each other. As depicted in FIG. 12, the recorded data file 200 may include the audio data 220.

In a step S109, whether or not the imaging apparatus 1 is instructed to terminate recording is determined. When it is determined that the imaging apparatus 1 has not yet instructed to terminate recording ("NO" in the step S109), the processes in the steps S101 and S103 are repeated, and the next group of frames are processed. On the other hand, when it is determined that the imaging apparatus 1 has been instructed to terminate recording ("YES" in the step S109), the file is closed and the present series of processes are terminated.

Three-Dimensional Audio Data Generating Processes

The flow of the sound recording to the reproduction (playback) when the three-dimensional audio data 230 in the Ambisonics format is adopted is described below with reference to FIG. 16, FIG. 17A, FIG. 17B, FIG. 17C, FIG. 17D, and FIG. 17E.

Figure 16B:
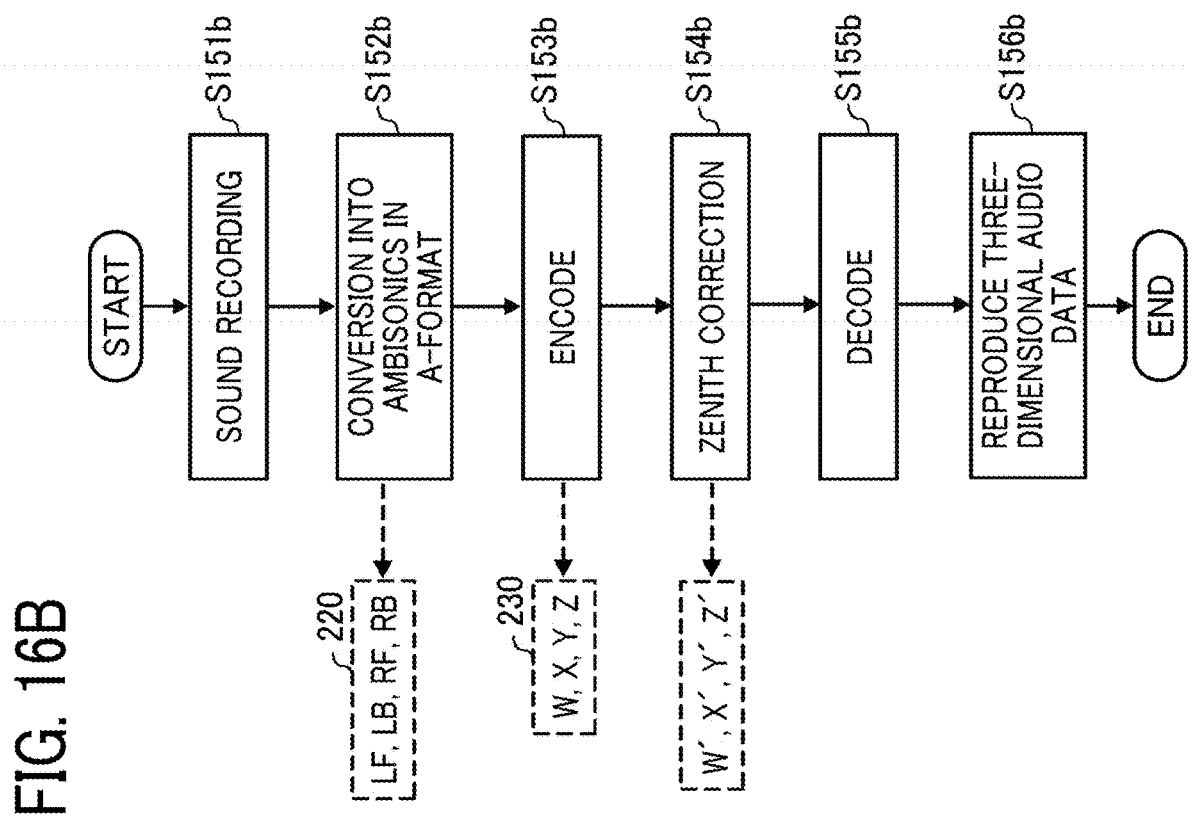
FIG. 16B is a flowchart of the processes of the sound recording to the reproduction of audio data when audio data in the Ambisonics format is adopted, according to an alternative embodiment of the present disclosure.
Figure 16A:
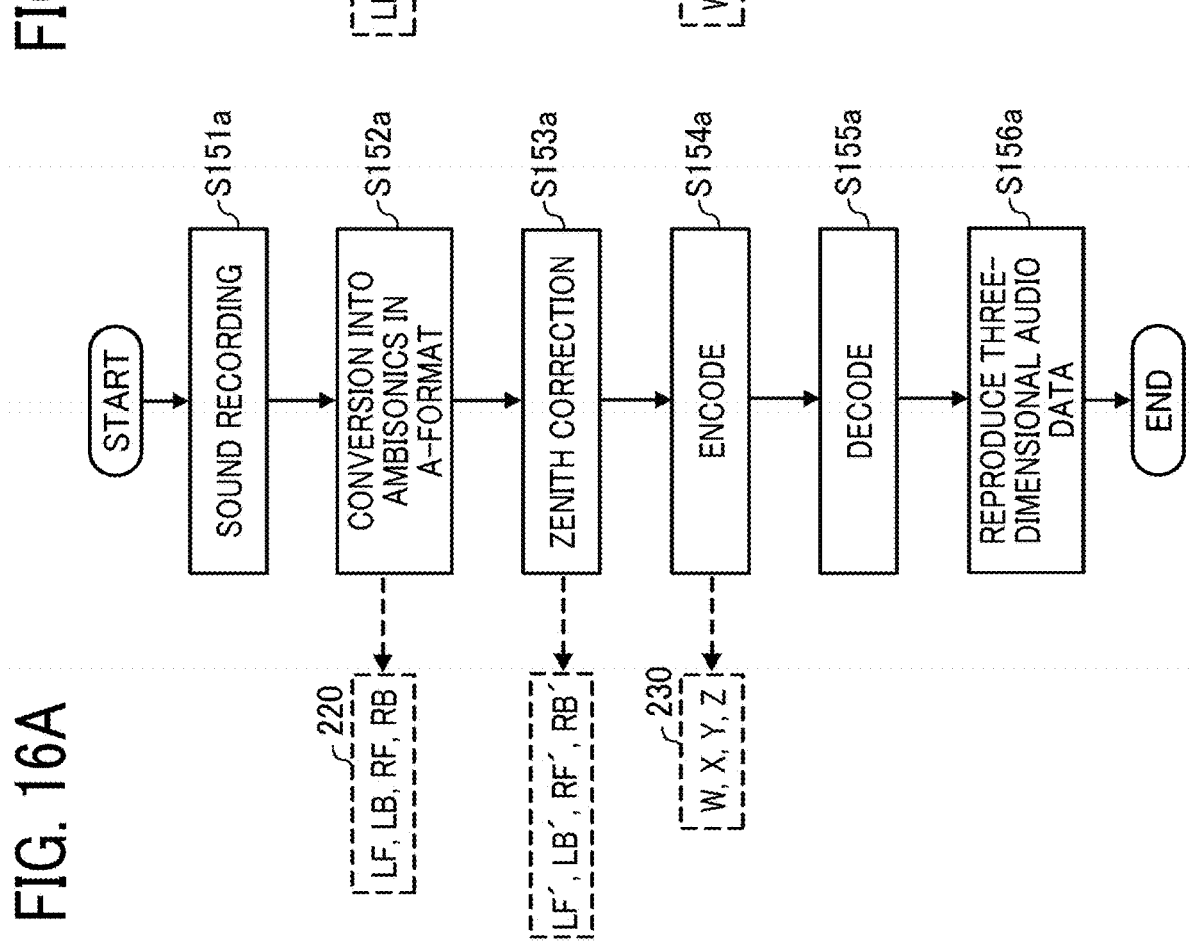
FIG. 16A is a flowchart of the processes of the sound recording to the reproduction of the audio data when audio data in the Ambisonics format is adopted, according to the first embodiment of the present disclosure.

FIG. 16A is a flowchart of the processes of the sound recording to the reproduction of the audio data, according to the first embodiment of the present disclosure.

In the step S151*a*, the sound recording unit 14 of the imaging apparatus 1 obtains the recorded audio data for each one of the multiple microphones 108*a* to 108*d* as illustrated in FIG. 9. In a step S152*a*, the image and audio processing unit 17 of the imaging apparatus 1 converts the audio data recorded on a channel-by-channel basis into the audio data 220 (LF, LB, RF, and RB) in the Ambisonics A-format, respectively. The converted audio data 220 (LF, LB, RF, and RB) is stored in the recorded data file 200 in association with the tilt angle data 250. Note that the processes in the step S152*a* are similar to the processes in the step S104 as illustrated in FIG. 15.

In a step S153*a*, the image and audio processing unit 17 of the imaging apparatus 1 performs zenith correction on the audio data 220 (LF, LB, RF, and RB). In a step S154*a*, the image and audio processing unit 17 of the imaging apparatus 1 uses an ambisonics encoder to encode the audio data (LF', LB', RF', and RB' in the Ambisonics A-format) whose zenith has been corrected, to generate the three-dimensional audio data 230 (W, X, Y and Z) in the Ambisonics B-format. For example, such encoding may be expressed as in Formula 2 given below. The imaging apparatus 1 records the sound using the four directional microphones that are disposed at the vertices of a regular tetrahedron, and generates an omnidirectional signal W, and bidirectional signals X, Y, and Z based on the recorded four sets of audio data.

$$W = LB - LF + RF - RB$$

$$X = LF - RB + RF - LB$$

$$Y = LF - RB - RF + LB$$

$$Z = LF - LB + RB - RF \qquad \text{[Formula 2]}$$

As a result of the conversion processes into the Ambisonics B-format, the omnidirectional signal W, and bidirectional signals X, Y, and Z are handled as the signals obtained by recording the sound with a virtual omnidirectional microphone and bidirectional microphones.

FIG. 17A is a diagram illustrating the definition of the axes of the imaging apparatus 1, according to the present embodiment.

When a user holds the imaging apparatus 1 as illustrated in FIG. 17A, the up-and-down directions of the imaging apparatus 1 are association with the Z-axis, and the right and left directions of the imaging apparatus 1 are association with the X-axis. Moreover, the forward and backward directions of the imaging apparatus 1 are association with the Y-axis.

FIG. 17B to FIG. 17E are diagrams each illustrating the sound-recording directional characteristics in the stereophonic sound, according to the present embodiment.

The W-channel in the Ambisonics B-format corresponds to the signals obtained by sound recording using an omnidirectional microphone as illustrated in FIG. 17B. The X-channel, the Y-channel, and the Z-channel in the Ambisonics B-format correspond to the signals obtained by sound recording using the bidirectional microphones as illustrated in FIG. 17C to FIG. 17E, respectively. As indicated by the Formula 2, the three-dimensional audio data 230 based on the audio data recorded for each one of the multiple microphones 108*a* to 108*d* is generated by relatively simple computations.

In a step S155a, the image and audio processing unit 17 of the imaging apparatus 1 uses an ambisonics decoder to decode the generated three-dimensional audio data 230 (W, X, Y, Z). Due to this decoding process, the image and audio processing unit 17 can generate a loudspeaker driving signal that is compatible with the configuration of the loudspeaker 515 of the communication terminal 5. The imaging apparatus 1 sends the decoded three-dimensional audio data 230 (i.e., the generated loudspeaker driving signal) to the communication terminal 5. Note that the decoding of the three-dimensional audio data 230 may be performed by the image and audio processing unit 56 of the communication terminal 5.

Then, in a step S156a, the sound reproducing unit 54 of the communication terminal 5 reproduces the decoded three-dimensional audio data 230. In other words, the sound of the generated loudspeaker driving signal is given off by the sound reproducing unit 54 of the communication terminal 5. As a result, the sound field with directivity is reproduced.

FIG. 16B is a flowchart of the processes of the sound recording to the reproduction of audio data according to an alternative embodiment of the present disclosure.

In the alternative embodiment of the present disclosure as illustrated in FIG. 16B, the imaging apparatus 1 encodes the audio data 220 that has been obtained through the multiple microphones 108a to 108d, to generate the three-dimensional audio data 230 on a temporary basis. Then, in the imaging apparatus 1 according to the present alternative embodiment, zenith correction is performed on the three-dimensional audio data 230.

In a step S151b, the sound recording unit 14 of the imaging apparatus 1 obtains the recorded audio data for each one of the multiple microphones 108a to 108d as illustrated in FIG. 9. In a step S152b, the image and audio processing unit 17 of the imaging apparatus 1 converts the audio data recorded on a channel-by-channel basis into the audio data 220 (LF, LB, RF, and RB) in the Ambisonics A-format, respectively. Note that the processes in the step S152b are similar to the processes in the step S104 as illustrated in FIG. 15.

In a step S153b, the image and audio processing unit 17 of the imaging apparatus 1 encodes the audio data 220 (LF, LB, RF, and RB) to generate the three-dimensional audio data 230 (W, X, Y, and Z in the Ambisonics B-format). The generated three-dimensional audio data 230 is stored in the recorded data file 200 in association with the tilt angle data 250.

In a step S154b, the image and audio processing unit 17 of the imaging apparatus 1 corrects the zenith of the three-dimensional audio data 230 (W, X, Y, Z). For example, the zenith correction that corresponds to the rotation by y on the horizontal plane as illustrated in FIG. 17A is achieved by the projective transformation as expressed in Formula 3 given below.

$$\begin{pmatrix} W' \\ X' \\ Y' \\ Z' \end{pmatrix} = \begin{pmatrix} 1 & 0 & 0 & 0 \\ 0 & \cos\gamma & \sin\gamma & 0 \\ 1 & -\sin\gamma & \cos\gamma & 0 \\ 0 & 0 & 0 & 1 \end{pmatrix} \begin{pmatrix} W \\ X \\ Y \\ Z \end{pmatrix} \quad \text{[Formula 3]}$$

In a step S155b, the image and audio processing unit 17 of the imaging apparatus 1 uses an ambisonics decoder to decode the three-dimensional audio data (W', X', Y', Z' in the Ambisonics B-format) whose zenith has been corrected. Due to this decoding process, the image and audio processing unit 17 can generate a loudspeaker driving signal that is compatible with the configuration of the loudspeaker 515 of the communication terminal 5. The imaging apparatus 1 sends the decoded three-dimensional audio data 230 whose zenith is corrected (i.e., the generated loudspeaker driving signal) to the communication terminal 5. Note that the image and audio processing unit 56 of the communication terminal 5 may decode the three-dimensional audio data (W', X', Y', Z') whose zenith has been corrected.

Then, in a step S156b, the sound reproducing unit 54 of the communication terminal 5 reproduces the three-dimensional audio data 230. In other words, the sound of the generated loudspeaker driving signal is given off by the sound reproducing unit 54 of the communication terminal 5. As a result, the sound field with directivity is reproduced.

As described above, the imaging apparatus 1 stores the tilt angle data 250 at the corresponding point in time, in association with the audio data 220 or the three-dimensional audio data 230 at a predetermined point in time. The imaging apparatus 1 can corrects the zenith of the audio data 220 or the three-dimensional audio data 230 according to the tilt angle data 250. Due to this configuration, a user can record omnidirectional video without having any concern about the states of the microphones 108a to 108d, while moving the imaging apparatus 1.

In FIG. 16A and FIG. 16B, cases in which the communication terminal 5 is provided with a plurality of loudspeakers were described. However, in some configurations, the three-dimensional audio data 230 may be viewed and listened using headphones. In such cases, the image and audio processing unit 17 of the imaging apparatus 1 once decodes the audio data into loudspeaker-compatible signals having a predetermined configuration, and then adds a predetermined head-related transfer function (HRTF) to the loudspeaker-compatible signals in an incorporated manner. As a result, binaural signals are output to the headphones coupled to the communication terminal 5.

In FIG. 16A and FIG. 16B, cases in which the audio data 220 (LF, LB, RF, and RB in the Ambisonics A-format) and the three-dimensional audio data 230 (W, X, Y, and Z in the Ambisonics B-format) are associated with the tilt angle data 250 were described. However, the formats of the recorded audio data 220 and the recorded three-dimensional audio data 230 are not limited thereby.

Further, in FIG. 16A and FIG. 16B, cases in which the imaging apparatus 1 performs processing on the audio data (i.e., conversion in to the audio data 220, zenith correction, encoding, and decoding) were described. However, at least some of the processing performed on the audio data may be performed by the communication terminal 5. In such a configuration, for example, the communication terminal 5 may correct the zenith of the audio data 220 obtained from the imaging apparatus 1 according to the tilt angle data 250 when omnidirectional video is being viewed.

Operation According to First Embodiment

Here, a method of generating and reproducing two-dimensional video according to the first embodiment is described with reference to FIG. 18 to FIG. 25.

Figure 18:
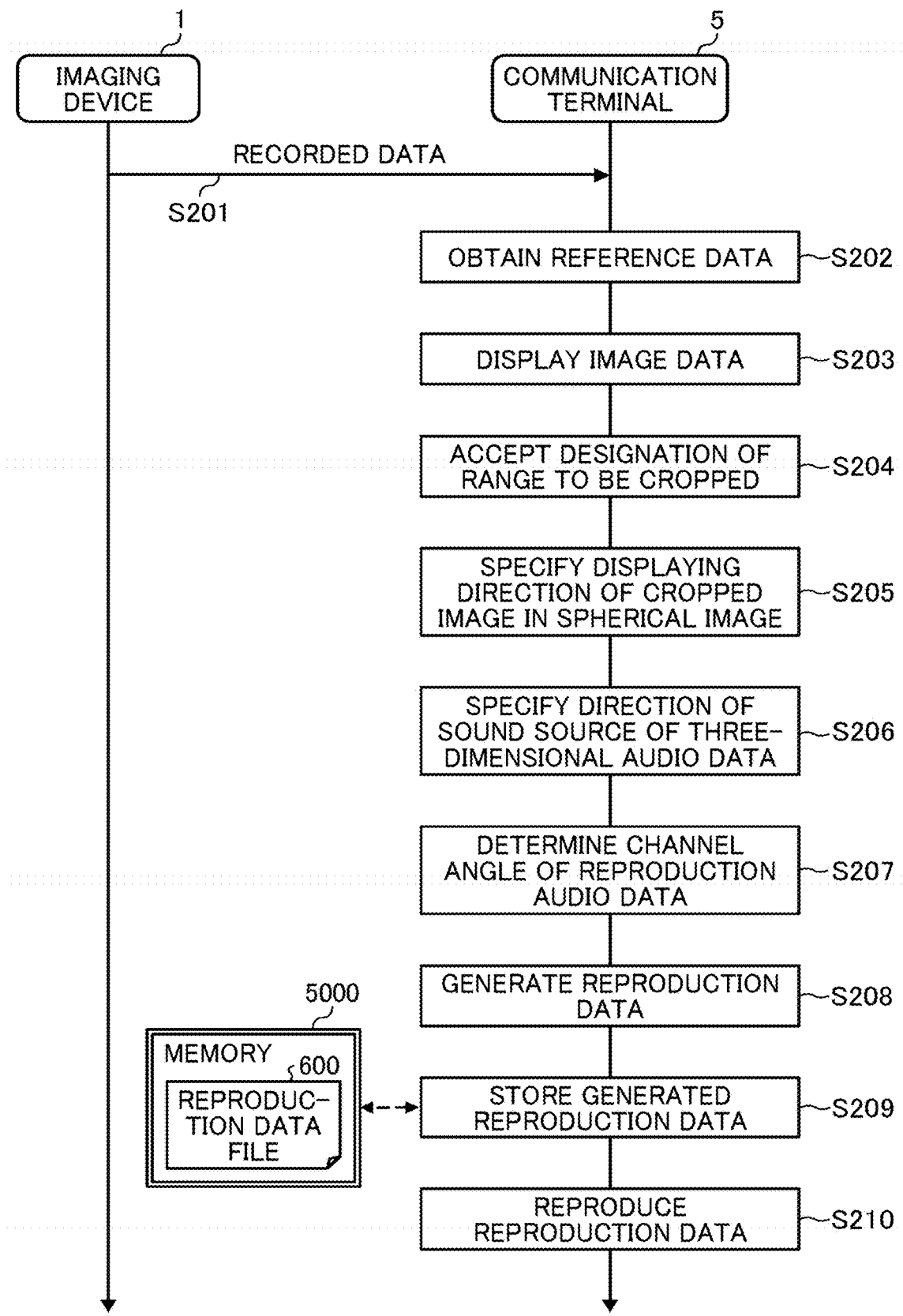
FIG. 18 is a sequence diagram illustrating the generating processes of reproduction data, in the information processing system according to the first embodiment of the present disclosure.

FIG. 18 is a sequence diagram illustrating the generating processes of reproduction data, in the information processing system according to the first embodiment of the present disclosure.

Firstly, in a step S201, the communication unit 11 of the imaging apparatus 1 transmits the recorded data file 200, which is generated by the image and audio processing unit 17, to the communication terminal 5. Note that the recorded data file 200 is generated by the image and audio processing unit 17 adopting the methods as described above with reference to FIG. 15 to FIG. 17E. In the recorded data file 200, is the omnidirectional video data obtained by the imaging apparatus 1 as an object is captured by the imaging apparatus 1, and includes the spherical image data 210, the audio data 220, the three-dimensional audio data 230, and the tilt angle data 250 as illustrated in FIG. 12.

In a step S202, the image and audio processing unit 56 of the communication terminal 5 received by the communication unit 51 obtains reference data from the recorded data file 200. The reference data is metadata of the spherical image data 210 included in the recorded data file 200 to be displayed on the display 517 of the communication terminal 5 as a planar image. For example, the reference data includes the angle θs in the display-area direction of the image data, the angle of view α, and the depth z of a display image.

Figure 19A:
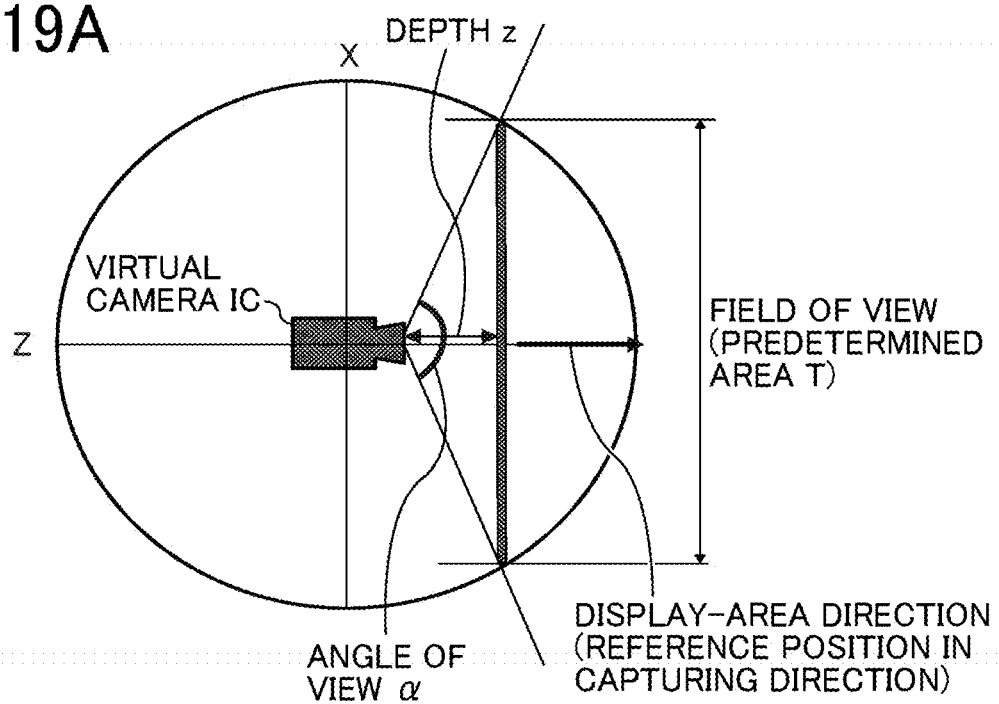
FIG. 19A and FIG. 19B are schematic diagrams each illustrating the displaying processes of a spherical image data in a communication terminal according to the first embodiment of the present disclosure.

FIG. 19A is a schematic diagram illustrating an image that is displayed on the communication terminal 5, according to the present embodiment.

The communication terminal 5 controls the display 517 to display an image in the field of view as illustrated in FIG. 19A. The field of view indicates the capturing range of a virtual camera IC, and is defined by the display-area direction and the angles of view α. The field of view corresponds to the predetermined area T as illustrated in FIG. 5. As described above with reference to FIG. 5, the display-area direction the capturing direction of the virtual camera IC (i.e., the reference position in the capturing direction) in the three-dimensional virtual space including the spherical image data 210. The angle θs in the display-area direction indicates the angle that the reference position on the spherical image in the capturing direction of the virtual camera IC forms with the display-area direction. In FIG. 19A, the angle θs of the display-area direction is 0°.

In a step S203, the display control unit 53 of the communication terminal 5 controls the display 517 to display an image.

Figure 19B:
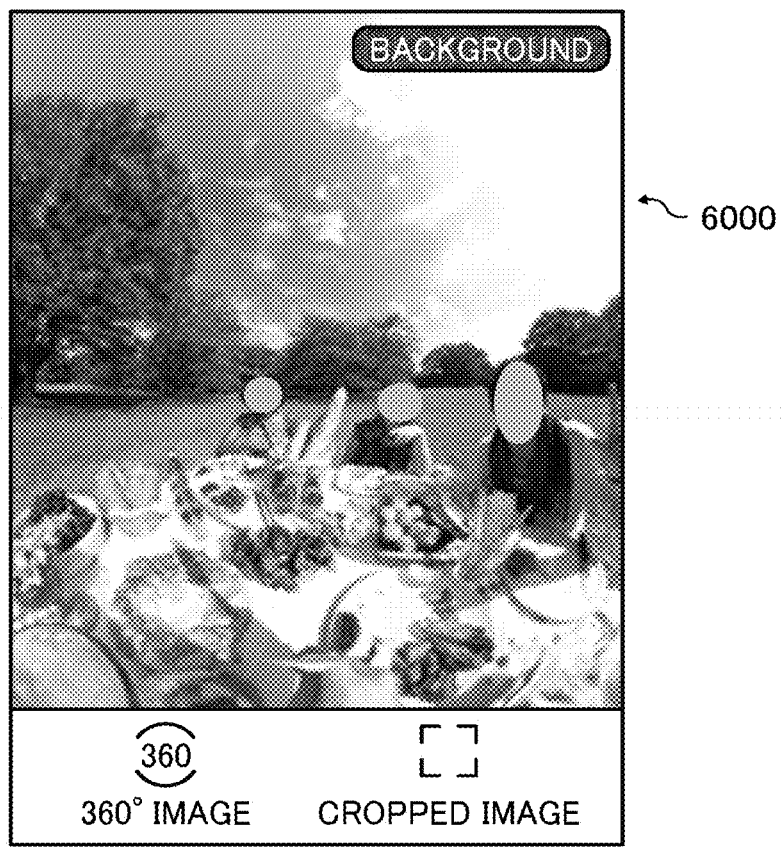

FIG. 19B is a diagram illustrating a display image displayed on the communication terminal 5, according to the present embodiment.

The image in the field of view as illustrated in FIG. 19A is displayed on a display screen 6000 as illustrated in FIG. 19B.

Figure 20A:
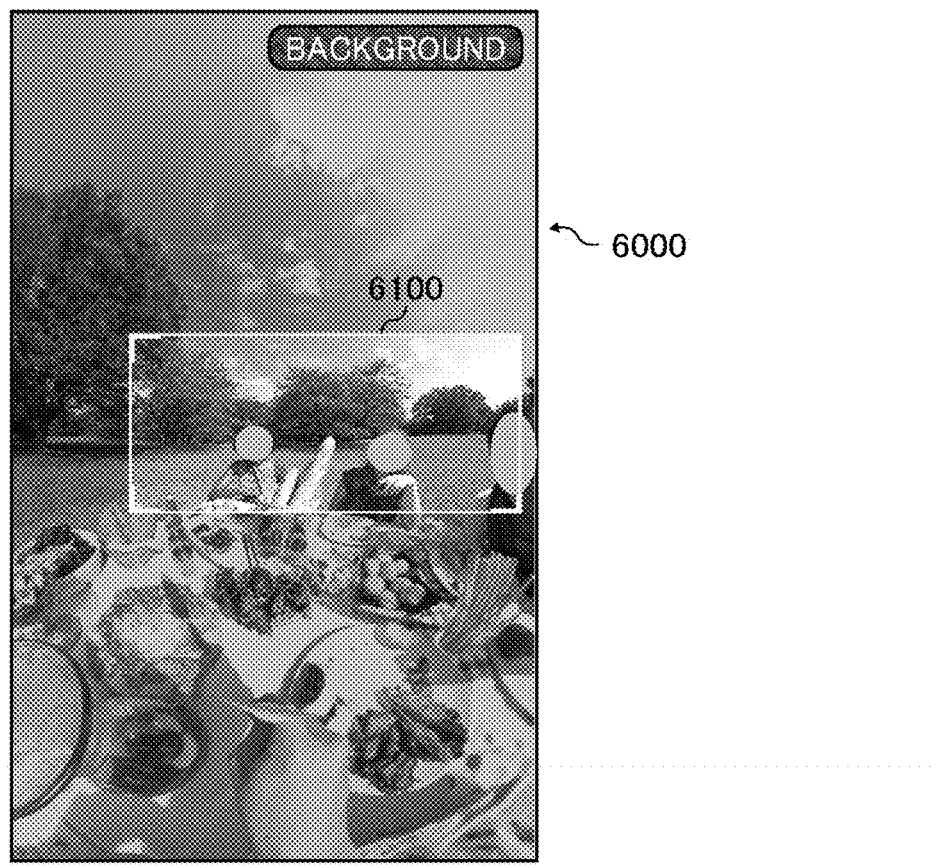
FIG. 20A and FIG. 20B are schematic diagrams each illustrating cropping processes from a display image in a communication terminal according to the first embodiment of the present disclosure.

In a step S204, the operation acceptance unit 52 of the communication terminal accepts the designation of a range to be cropped made on the display screen 6000 (an example of an accepting step). More specifically, the operation acceptance unit 52 displayed under the display screen 6000 illustrated in FIG. 19B accepts the selection of the cropped-image icon. When the selection of the cropped-image icon is accepted by the operation acceptance unit 52, the display control unit 53 controls the display screen 6000 to display a range to be cropped 6100 as illustrated in FIG. 20A. Then, the operation acceptance unit 52 accepts the designation of the range to be cropped 6100 as illustrated in FIG. 20A, and specifies the range to be cropped.

Figure 20B:
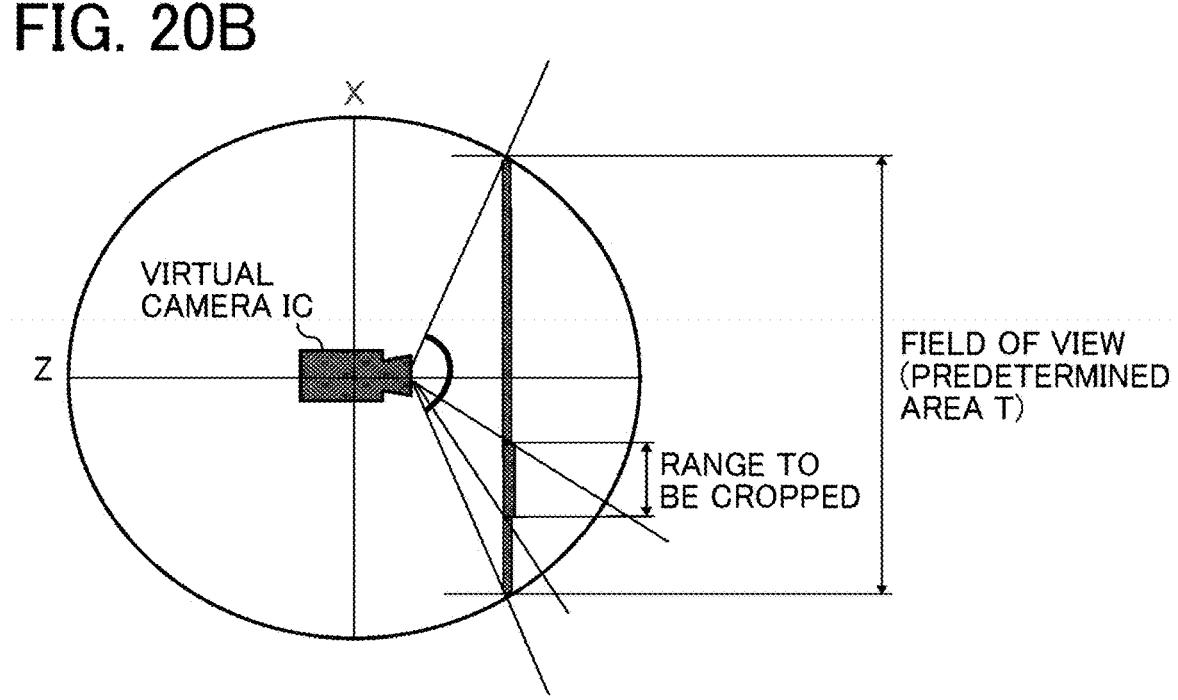

For example, the designation of a range to be cropped is achieved by particular input operation such as tapping, dragging, a swipe, a pinch in, and a pinch out performed on the range to be cropped 6100. As illustrated in FIG. 20B, the range to be cropped is a specific area in the field of view in the spherical image data. A user of the communication terminal 5 designates a range to be cropped on the range to be cropped 6100. Due to this configuration, he or she can move the range to be cropped 6100 and increase or reduce the size of the range to be cropped 6100.

In a step S205, the image data management unit 61 of the communication terminal 5 specifies the displaying direction of the cropped image in the spherical image. The displaying direction of the cropped image indicates the position of the cropped image 6200, which is the image of the designated range to be cropped 6100 in the spherical image.

Figure 21A:
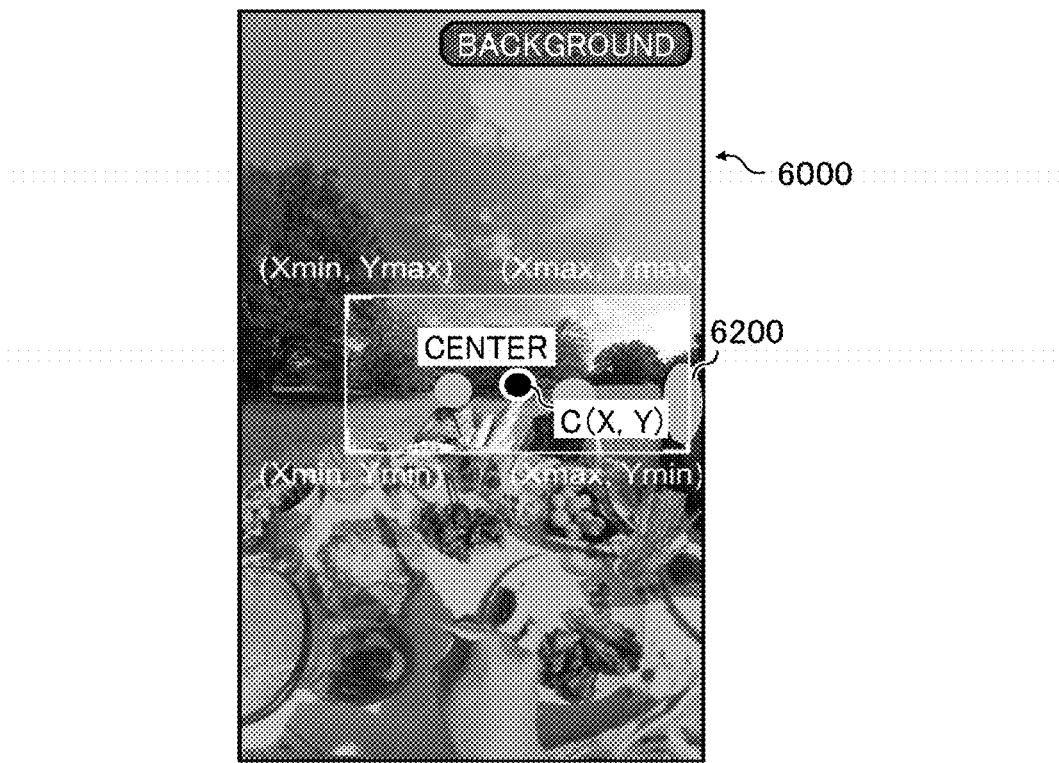
FIG. 21A and FIG. 21B are schematic diagrams each illustrating how the position of an image cropped from a spherical image is calculated and obtained, in a communication terminal according to the first embodiment of the present disclosure.
Figure 21B:
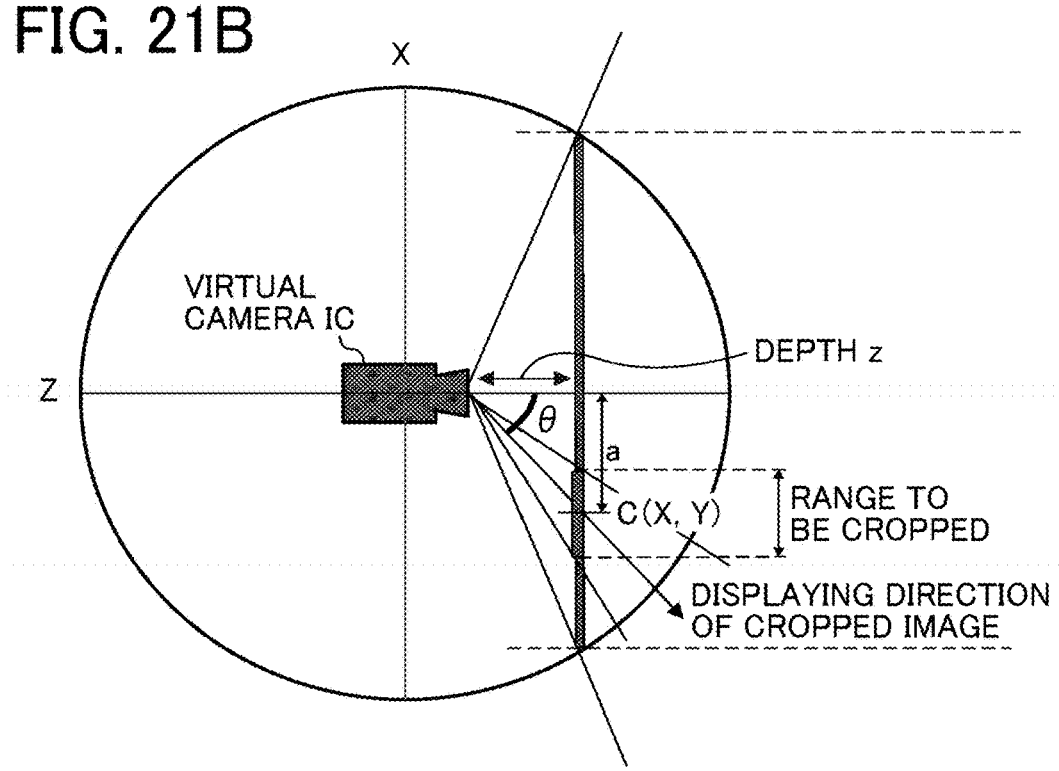
Figures 22, 23:
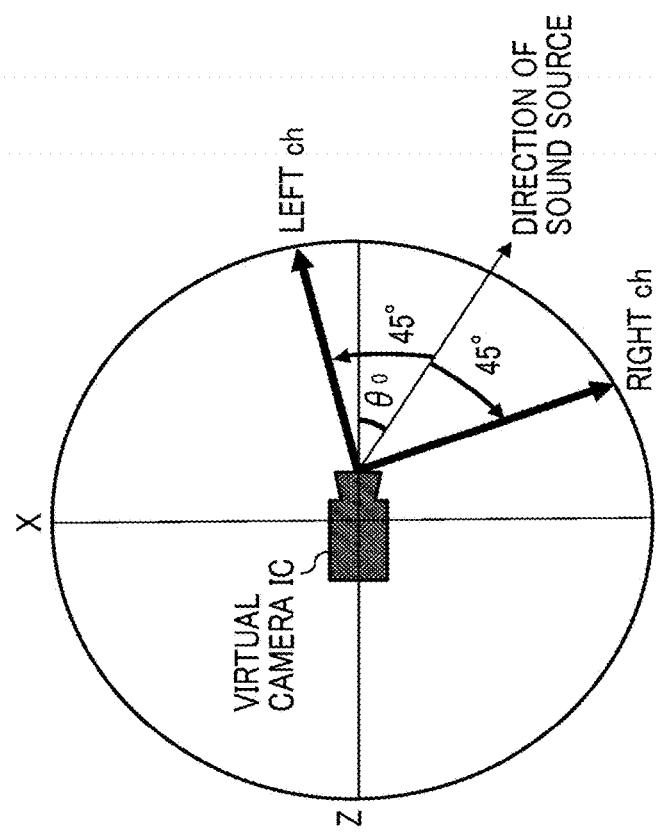
FIG. 22 is a diagram illustrating the coordinate data of a cropped image according to the first embodiment of the present disclosure.
FIG. 23 is a schematic diagram illustrating the sound-source direction of reproduction audio data, according to the first embodiment of the present disclosure.

With reference to FIG. 21A, FIG. 21B, and FIG. 22, how the displaying direction of the cropped image is specified is described below. Firstly, as illustrated in FIG. 21A, the image data management unit 61 the coordinate data of the cropped image 6200 is calculated and obtained. The coordinate data of the cropped image 6200 is the coordinates of a planar image (i.e., the coordinates on the XY plane) in the field of view, which is displayed on the communication terminal 5. The image data management unit 61 calculates and obtains the maximum value (Xmax) and the minimum value (Xmin) of the X-coordinate on the cropped image 6200, and the maximum value (Ymax) and the minimum value (Ymin) of the Y-coordinate on the cropped image 6200.

Subsequently, the image data management unit 61 calculates and obtains the center coordinates C(X, Y) of the cropped image 6200 using the calculated and obtained coordinate data of the cropped image 6200.

FIG. 22 is a diagram depicting the parameters of the cropped image 6200 as illustrated in FIG. 21A, according to the present embodiment.

The parameters depicted in FIG. 22 are parameters that defines the cropped image 6200, and includes the reference data of the display screen 6000 and the coordinate data of the cropped image 6200, which are obtained in the step S201. Regarding the display screen 6000 as illustrated in FIG. 21A, the angle of view α in the horizontal direction, the depth z, the angle 0 s in the display-area direction are 120°, 0.5, and 0°, respectively. The coordinate data of the cropped image 6200 as illustrated in FIG. 21A is as follows.

X-coordinate (Xmax, Xmin)=(0.95, −0.45)
Y-coordinate (Ymax, Ymin)=(−0.20, 0.20)

Further, the coordinates C(X, Y) of the center position of the cropped image 6200 as illustrated in FIG. 21A is (0.25, 0).

Then, the image data management unit 61 calculates and obtains the angle θ of the displaying direction of a cropped image using the calculated and obtained coordinate data of the cropped image 6200. The angle θ of the displaying direction of the cropped image indicates the angle that the reference position on the spherical image with reference to the cropped image in the capturing direction of the virtual camera IC forms with the displaying direction of the cropped image.

FIG. 21B is a schematic diagram illustrating a method of calculating the angle θ of a cropped image in the displaying direction, according to the present embodiment.

As illustrated in FIG. 21B, "a" denotes the distance between the reference position on the XZ-plane in the spherical image in the capturing direction of the virtual camera IC and the center position of the cropped image 6200.

"z" denotes the depth of the display screen 6000. The angle θ of the displaying direction of the cropped image 6200 is calculated using Formula 4 given below.

$$\theta = \arctan(a/z) \qquad \text{[Formula 4]}$$

In the case of the cropped image 6200 as illustrated in FIG. 21A, θ=22.5° as a=0.25 and z=0.5. As described above, the image data management unit 61 calculates the angle θ of the displaying direction of the cropped image 6200 to specify the displaying direction of the cropped image 6200.

The designation of a range to be cropped in the step S204 is not limited to the operation in which the range to be cropped 6100 is designated by a rectangular region as illustrated in FIG. 20A and FIG. 20B. Alternatively, the designation of a range to be cropped in the step S204 may be an operation in which the center position is designated. In other words, in some embodiments, a desired displaying direction (position) may be designated on the spherical image displayed on the display screen 6000, instead of designating a range with a shape. The operation acceptance unit 52 of the communication terminal 5 accepts the designation of a desired displaying direction (position) on the spherical image. In such a configuration, the range is specified by a predetermined shape or size (for example, it is satisfactory as long as a size suitable for two-dimensional display such as 4:3 and 16:9 is specified). Due to this configuration, the processes in the steps S204 and S205 as illustrated in FIG. 18 are integrated, and a desired displaying direction (position) on the spherical image is designated by a user in such an integrated process.

In a step S206, the audio data management unit 62 of the communication terminal 5 specifies the sound-source direction of the three-dimensional audio data 230 based on the specified displaying direction of the cropped image 6200. More specifically, the audio data management unit 62 calculates the angle $θ_0$ in the sound-source direction that correspond to the angle θ of the specified displaying direction of the cropped image 6200. The angle $θ_0$ in the sound-source direction takes a value as expressed in "θs (angle in the display-area direction)+θ (angle of the displaying direction of the cropped image 6200)." In the present embodiment, the angle 0 s of the display-area direction is 0°. Accordingly, the angle $θ_0$ of the sound-source direction that corresponds to the displaying direction of the cropped image 6200 is equal to θ ($θ_0$=θ).

Then, the audio data management unit 62 calculates and obtains the angles $θ_1$ and $θ_2$ in the right and left channel directions with reference to the calculated and obtained sound-source direction. The audio data management unit 62 specifies the two directions that are equidistant with reference to the sound-source direction that corresponds to the displaying direction of the cropped image 6200, as the sound-source direction of the reproduction audio data 650. More specifically, as illustrated in FIG. 23, the audio data management unit 62 calculates, for example, the angle $θ_1$ in the channel direction of the left channel (left ch) that is tilted by −45° with reference to the sound-source direction that corresponds to the displaying direction of the cropped image 6200 and the angle $θ_2$ in the channel direction of the right channel (right ch) that is tilted by +45° with reference to the sound-source direction that corresponds to the displaying direction of the cropped image 6200. In the case of the cropped image 6200 as illustrated in FIG. 21A, $θ_1$ is equal to $θ_0$−45°. Accordingly, $θ_1$=−22.5°. On the other hand, $θ_2$ is equal to $θ_0$+45°. Accordingly, $θ_2$=67.5°.

The audio data management unit 62 calculates and obtains $θ_1$ and $θ_2$ such that the sum total of the angle that the left-channel direction forms with the sound-source direction that corresponds to the displaying direction of the cropped image 6200 and the angle that the right-channel direction forms with the sound-source direction that corresponds to the displaying direction of the cropped image 6200 becomes 90°. Note that the sum total of the angle that the left-channel direction forms with the sound-source direction that corresponds to the displaying direction of the cropped image 6200 and the angle that the right-channel direction forms with the sound-source direction that corresponds to the displaying direction of the cropped image 6200 is not limited to 90°. It is satisfactory as long as the angles that the sound-source direction that corresponds to the displaying direction of the cropped image 6200 forms with the right and left channel directions are approximately the same. As described above, the audio data management unit 62 calculates the angles $θ_1$ and $θ_2$ of two channels in the sound-source direction. Due to this configuration, the sound-source direction of the reproduction audio data 650 is specified as the direction of the sound source of the three-dimensional audio data 230.

Figures 24, 25:
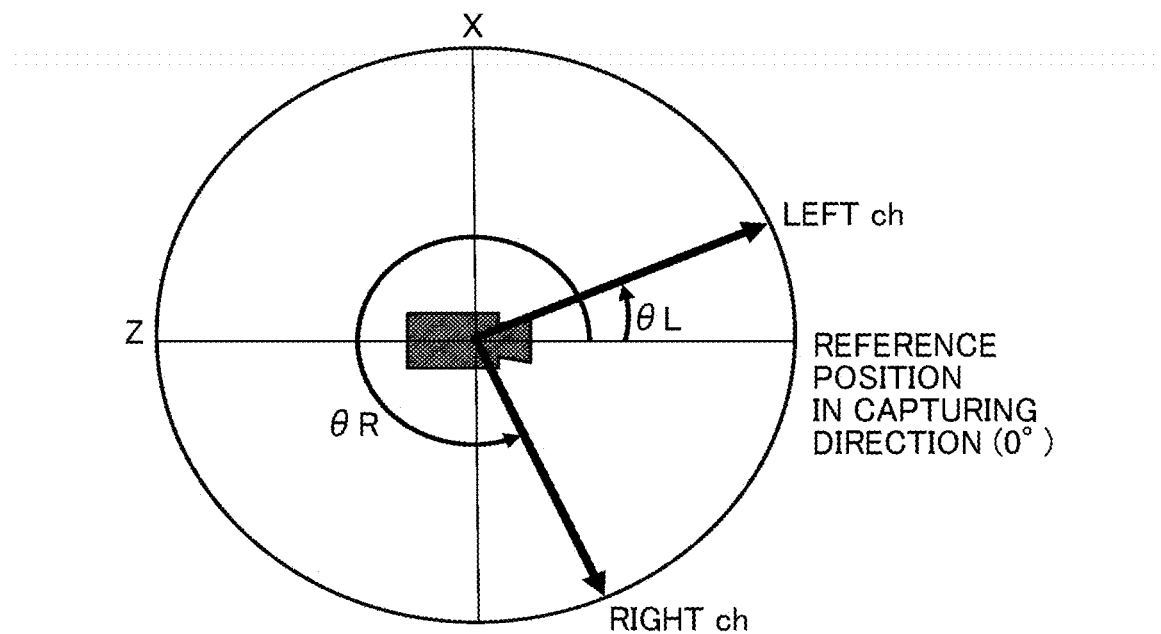
FIG. 24 is a schematic diagram illustrating how reproduction audio data is generated, according to the first embodiment of the present disclosure.
FIG. 25 is a diagram depicting parameters for generating reproduction audio data, according to the first embodiment of the present disclosure.

In a step S207, the audio data management unit 62 of the communication terminal 5 determines the channel angle of the reproduction audio data 650. More specifically, the audio data management unit 62 determines the channel angles $θ_L$ and $θ_R$ based on the calculated and obtained angles $θ_1$ and $θ_2$ of the reproduction audio data 650 in the channel direction. As illustrated in FIG. 24, $θ_L$ denotes the angle of the left channel of the two-dimensional stereophonic sound, and $θ_R$ denotes the angle of the right channel of the two-dimensional stereophonic sound. The audio data management unit 62 determines the channel angle $θ_L$ obtained by converting the angle $θ_1$ in the sound-source direction of the left channel into an angle in a counterclockwise direction with reference to the reference position in the capturing direction. In a similar manner, the audio data management unit 62 determines the channel angle $θ_R$ obtained by converting the angle $θ_2$ in the sound-source direction of the right channel into an angle in a counterclockwise direction with reference to the reference position in the capturing direction.

In a step S208, the reproduction data generation unit 63 generates reproduction data to be reproduced on the communication terminal 5 (i.e., an example of a generating step). More specifically, the reproduction data generation unit 63 generates the reproduction audio data that corresponds to the determined channel angle of the reproduction audio data.

FIG. 25 is a diagram depicting parameters for generating reproduction audio data, according to the first embodiment of the present disclosure.

The parameters depicted in FIG. 25 are used to generate the reproduction audio data 650 of one frame, which is included in the reproduction data file 600 illustrated in FIG. 14. The parameters depicted in FIG. 25 include the data of the θ, the $θ_0$, the angle $θ_1$, the angle $θ_2$, the left-channel angle $θ_L$, and the right-channel angle $θ_R$ as described above.

In the present embodiment, the left-channel angle $θ_L$ is 22.5°, and the right-channel angle $θ_R$ is 292.5° The reproduction data generation unit 63 uses Formula as given below to generate the reproduction audio data 650.

$$M(θ,p)=p(\sqrt{2})W+(1-p)(X \cos θ+Y \sin θ) \qquad \text{[Formula 5]}$$

W, X, and Y are parameters in the Ambisonics B-format. The parameters W, X, Y can be calculated with the methods depicted in FIG. 16A and FIG. 16B, using the audio data 220 included in the recorded data file 200. "p" in the Formula 5 as above denotes a parameter for obtaining a predetermined primary polar pattern (for example, omnidirectional, cardioid, hyper-cardioid, and figure of 8 (bi-directional)) that indicates specific directionality. The primary polar patterns that correspond to the parameter p are depicted in Table 1 given below. Due to this configuration, the values of W, X, Y, Z, and p that are applied to right-channel audio data $M_L$ ($θ_L$, p) and left-channel audio data $M_R$ ($θ_R$, p) are the same.

The value of "p" may be edited or adjusted as desired according to the patterns of the sound to be obtained (generated).

TABLE 1

| p (0 ≤ p ≤ 1) | Pattern |
|---|---|
| 0 | Figure-of-eight |
| (0, 0.5) | Hyper-and Supercardioids |
| 0.5 | Cardioid |
| (0.5, 1.0) | Wide cardioids |
| 1.0 | Omnidirectional |

The reproduction data generation unit 63 uses the Formula 5 as above to generate audio data of two channels including the right-channel audio data $M_L$ ($\theta_L$, p) and the left-channel audio data $M_R$ ($\theta_R$, p). As described above, the reproduction data generation unit 63 can generate the reproduction audio data 650 based on the product of the angle obtained from the displaying direction of the cropped image 6200 and the pattern of the three-dimensional audio data 230.

Then, the reproduction data generation unit 63 associates the generated reproduction audio data 650 with the cropped image data 610 of the corresponding frame to generate reproduction data. The reproduction audio data $M_L$ ($\theta_L$, p) and $M_R$ ($\theta_R$, p) corresponds to the audio data (L and R) of one frame in the reproduction audio data 650 as illustrated in FIG. 14.

In a step S209, the data processor 57 controls the memory 5000 to store the reproduction data generated by the reproduction data generation unit 63 as the reproduction data file 600.

In a step S210, the display control unit 53 and the sound reproducing unit 54 of the communication terminal 5 displays the cropped image data 610 included in the reproduction data file 600 and plays back the reproduction audio data 650 included in the reproduction data file 600. As described above, the communication terminal 5 plays back the generated reproduction data on a one-frame-by-one-frame basis. Accordingly, a specific area of the omnidirectional video can be played back as two-dimensional video.

In the above description, cases in which an omnidirectional image (spherical image) is obtained as captured by the imaging apparatus 1 were described. However, no limitation is indicated thereby, and the images that are obtained by the imaging apparatus 1 are not limited to spherical images. The images that are obtained by the imaging apparatus 1 may be a wide-angle image with an angle of view having a value equal to or greater than a predetermined value. In such cases, such a wide-angle image is obtained by the imaging apparatus 1 such as a wide-angle camera and a stereo camera. In other words, is satisfactory as long as the imaging apparatus 1 is an imaging unit that can obtain an image (e.g., a spherical image and a wide-angle image) captured using a lens whose focal length is shorter than a predetermined value.

Due to the configurations as described above, when a certain area of the omnidirectional video is converted into two-dimensional video, the information processing system according to the first embodiment of the present disclosure can generate the two-dimensional audio data that is associated with the two-dimensional image data.

First Modification of First Embodiment

A first modification of the first embodiments of the present disclosure is described below. In the above first embodiment, processes in which two-dimensional video including a part of an object is generated from the omnidirectional video data obtained by the imaging apparatus 1 as an object is captured by the imaging apparatus 1 were described. However, the images that are captured by the imaging apparatus 1 or the images that are reproduced by the communication terminal 5 may be still images. In such cases, the recorded data file 200a as depicted in FIG. 31 is stored instead of the recorded data file 200 (see FIG. 12) stored in the memory 1000 of the imaging apparatus 1.

Figure 31:
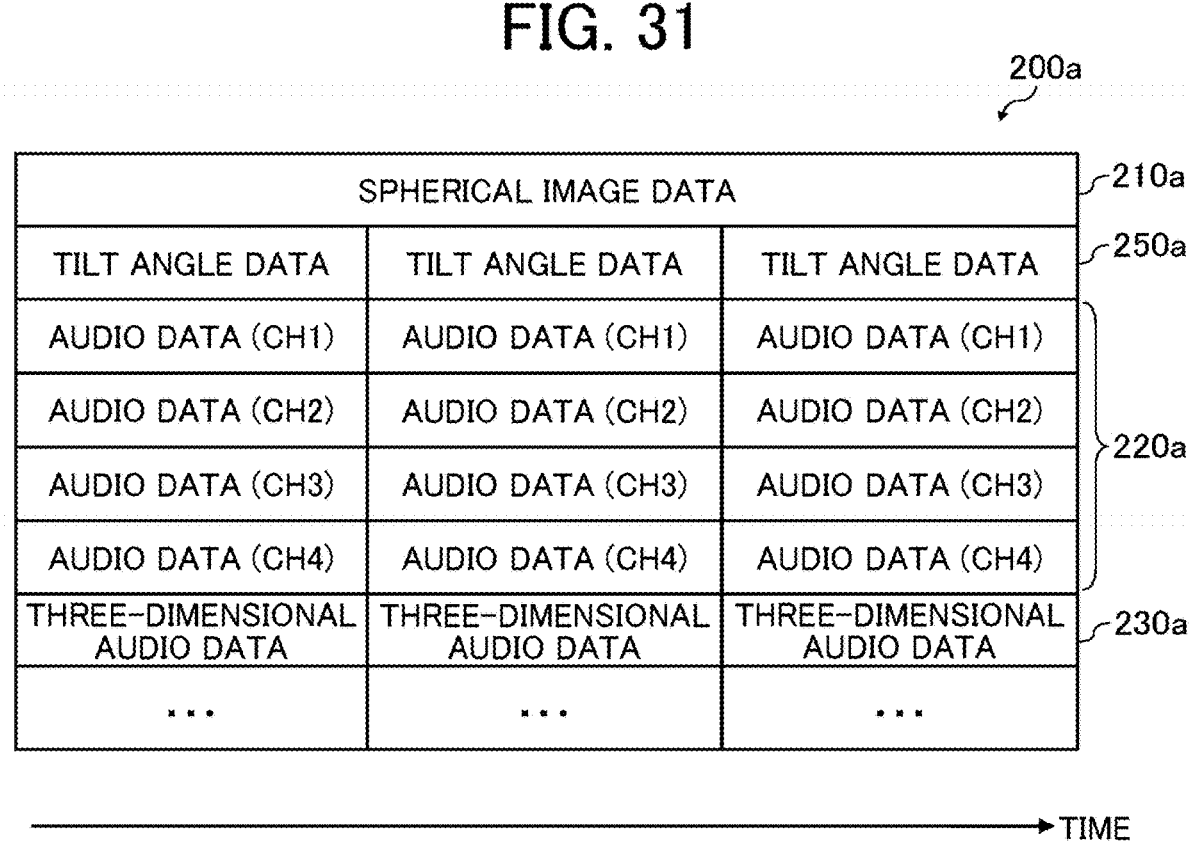
FIG. 31 is a diagram illustrating recorded data according to a first modification of the first embodiment of the present disclosure.

FIG. 31 is a diagram depicting the recorded data according to the first modification of the first embodiments of the present disclosure.

In the recorded data file 200a as depicted in FIG. 31, spherical image data 210a is stored as a still-image data in a predetermined format, and audio data 220a, three-dimensional audio data 230a, and tilt angle data 250a are stored separately with reference to the shooting time. Due to this configuration, the imaging apparatus 1 can record the audio data for accurate length of time while capturing a spherical image as a still image. In the spherical image data 210a, a single image (the same image) may be recorded as depicted in FIG. 31. Alternatively, in the spherical image data 210a, several images (different images) may be stored for different points in time.

Figure 32:
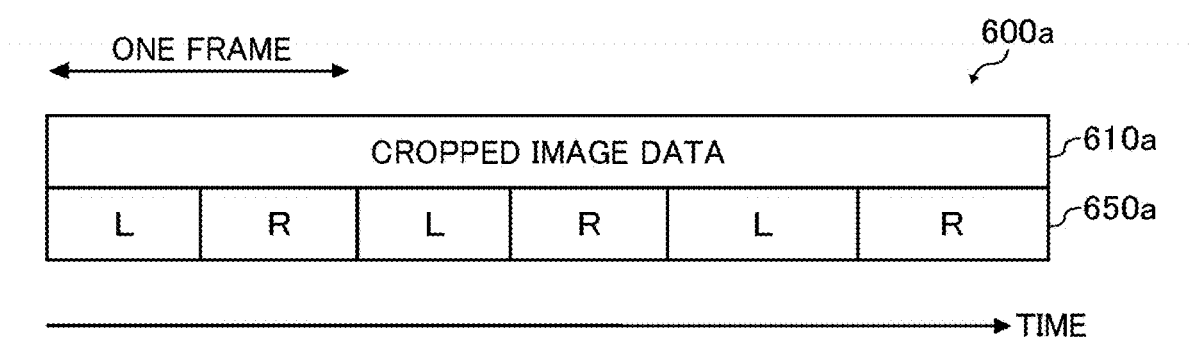
FIG. 32 is a diagram illustrating reproduction data according to the first modification of the first embodiment of the present disclosure.

In the memory 5000 of the communication terminal 5, reproduction data file 600a as illustrated in FIG. 32 is stored in place of the reproduction data file 600 (see FIG. 14). In the reproduction data file 600a as illustrated in FIG. 32, cropped image data 610a is stored as a still-image data in a predetermined format, and reproduction audio data 650a is stored for each frame. Due to this configuration, the communication terminal 5 can play back the audio data for accurate length of time while displaying a still image. In the cropped image data 610a, a single image (the same image) may be recorded as depicted in FIG. 32. Alternatively, in the cropped image data 610a, several images (different images) may be stored for different points in time.

In some embodiments, the display control unit 53 of the communication terminal may reproduce a two-dimensional image as a still image, which is generated based on the spherical image obtained by the imaging apparatus 1 as a still-image data. In some embodiments, the display control unit 53 of the communication terminal 5 may reproduce a two-dimensional image as a still image, which is generated based on the omnidirectional video obtained by the imaging apparatus 1.

Second Modification of First Embodiment

A second modification of the first embodiment of the present disclosure is described below. In the first embodiment of the present disclosure as described above, cases in which the cropped image data 610 (i.e., an example of two-dimensional image data) and the reproduction audio data 650 (an example of two-dimensional audio data) whose sound-source direction has been specified are generated as the reproduction data were described. However, in some embodiments, the communication terminal 5 may generate only the reproduction audio data 650 without the generation of the cropped image data 610. The two-dimensional image data that is obtained by cropping the range to be cropped specified by a user is a part of the spherical image data that is obtained by the imaging apparatus 1 by capturing an object. Due to this configuration, in the present modification of the first embodiment, the communication terminal 5 stores the range to be cropped in advance, and generates only the reproduction audio data 650 whose sound-source direction has been specified in the processes as illustrated in FIG. 18. When the reproduction data is to be played back, the communication terminal 5 is configured not to accept changes in display area with reference to the displaying direction (position) that is specified as the range to be cropped, and plays back the reproduction data together with the generated reproduction audio data 650. Due to this configuration, the communication terminal 5 does not have to generate the two-dimensional image data. Accordingly, the processing time and the amount of data to be processed can be reduced.

Second Embodiment

An information processing system according to a second embodiment of the present disclosure is described below. Note that like reference signs are given to like elements or functions similar to those described as above in the first embodiment, and their detailed description is omitted. In the information processing system according to the second embodiment, the image processing server 7 generates two-dimensional audio data. Due to this configuration, the information processing system according to the second embodiment while reducing the processing load on the communication terminal 5A can generate the two-dimensional audio data that is associated with the two-dimensional image data.

System Configuration

Firstly, a schematic configuration of the information processing system according to the second embodiment of the present disclosure is described with reference to FIG. 26.

Figure 26:
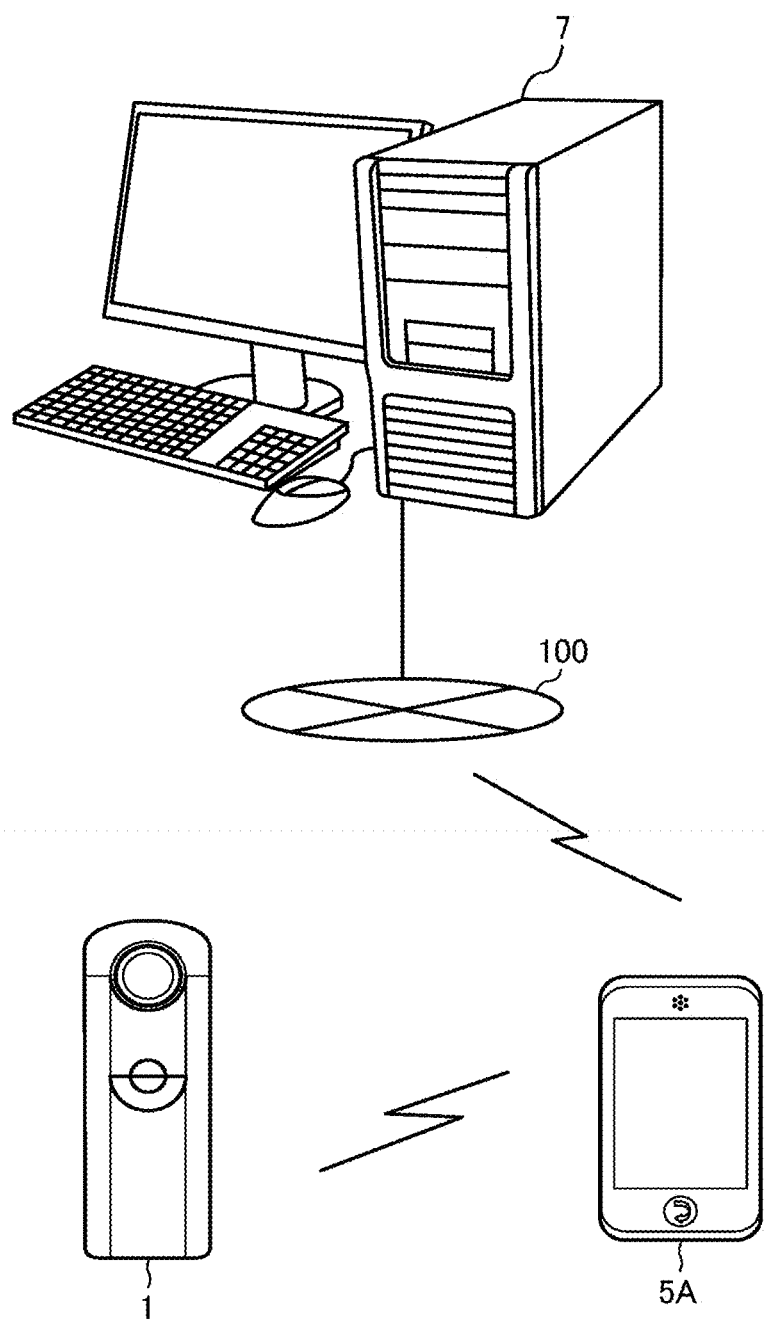
FIG. 26 is a diagram illustrating a system configuration of an information processing system according to a second embodiment of the present disclosure.

FIG. 26 is a diagram illustrating a system configuration of the information processing system according to the second embodiment of the present disclosure.

As illustrated in FIG. 26, in the information processing system according to the second embodiment, an image processing server 7 is further added to the configuration according to the first embodiment. The communication terminal 5A and the image processing server 7 can communicate with each other through a communication network 100 such as the Internet or intranet.

The image processing server 7 is a server computer, and image processing may be performed in a distributed manner using a plurality of server computers. The image processing server 7 stores the omnidirectional video data that is recorded by the imaging apparatus 1 and the two-dimensional video data to be displayed (reproduced) on the communication terminal 5A. Moreover, the image processing server 7 in response to a request sent from the communication terminal 5A performs image processing and sound processing on the omnidirectional video data, and provides the communication terminal 5A with the processed data. The image processing server 7 is an example of an external device.

Hardware Configuration

A hardware configuration of the image processing server 7 according to the second embodiment of the present disclosure is described below with reference to FIG. 27. As the hardware configurations of the imaging apparatus 1 and the communication terminal 5A according to the second embodiment are similar to those of the first embodiment, their detailed description is omitted.

Hardware Configuration of Image Processing Server

Figure 27:
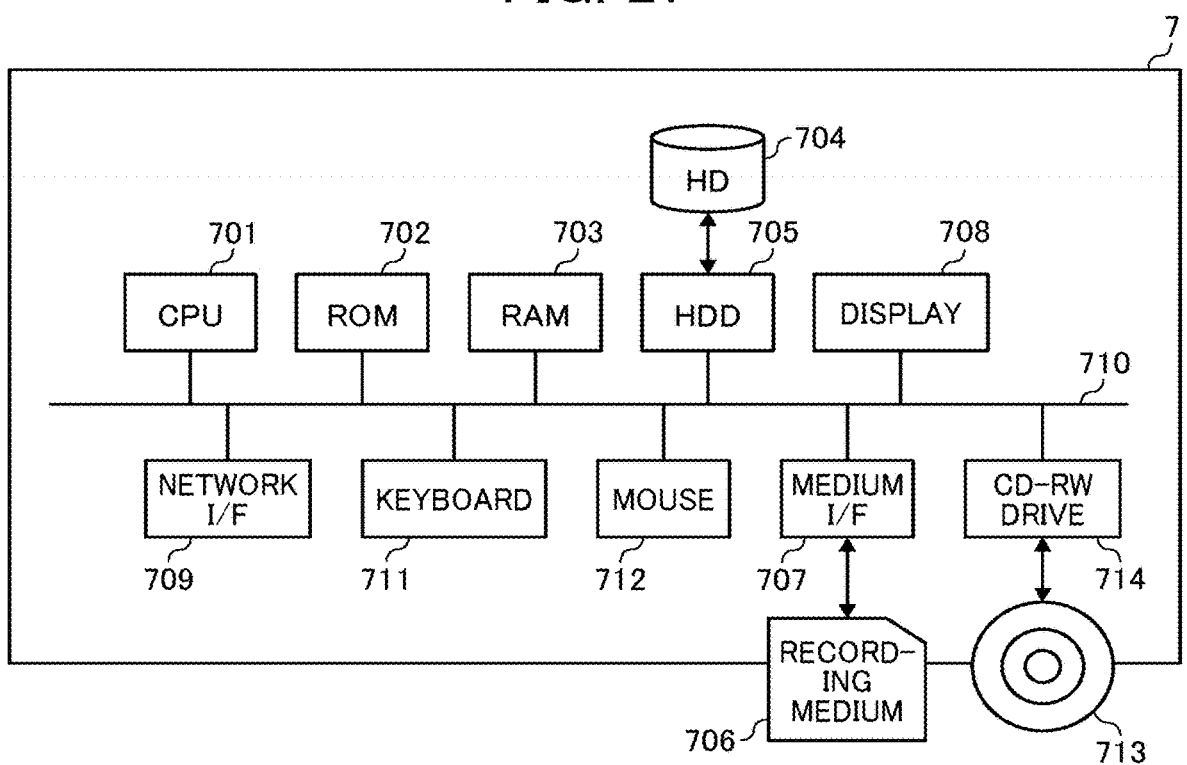
FIG. 27 is a diagram illustrating a hardware configuration of an image processing server, according to the second embodiment of the present disclosure.

FIG. 27 is a diagram illustrating a hardware configuration of the image processing server 7 according to the second embodiment of the present disclosure.

The image processing server 7 is configured by a general-purpose computer. The image processing server 7 is provided with a CPU 701, a ROM 702, a random access memory (RAM) 703, a hard disk drive (HDD) 705, a medium interface (I/F) 707, a display 708, a network interface (I/F) 709, a keyboard 711, a mouse 712, a compact disc rewritable (CD-RW) drive 714, and a bus line 710. As the image processing server 7 serves as a server, it is not always necessary for the image processing server 7 to be provided with an input device such as the keyboard 711 and the mouse 712 or an output device such as the display 708.

The CPU 701 controls the entire operation of the image processing server 7. The ROM 702 stores a control program for operating the CPU 701. The RAM 703 is mainly used as a work area in which the CPU 701 executes a program. The HDD 705 controls reading or writing of various kinds of data to or from the HD 704 under control of the CPU 701. The HD 704 stores various kinds of data such as a program. The medium interface 707 controls reading or writing of data to or from a recording medium 706 such as a flash memory.

The display 708 displays various kinds of information such as a cursor, menu, window, characters, or image. The network interface 709 controls data communication with an external device through the communication network 100. The keyboard 711 is one example of input device provided with a plurality of keys for allowing a user to input characters, numeral values, or various instructions. The mouse 712 is one example of input device for selecting or executing various kinds of instructions, selecting an object to be processed, or for moving a cursor. For example, the CD-RW drive 714 reads various kinds of data from a CD-RW 713, which is one example of removable recording medium.

The image processing server 7 also includes a bus line 710. The bus line 710 is, for example, an address bus or a data bus, which electrically connects various elements such as the CPU 701 illustrated in FIG. 32.

Functional Configuration

Figure 28:
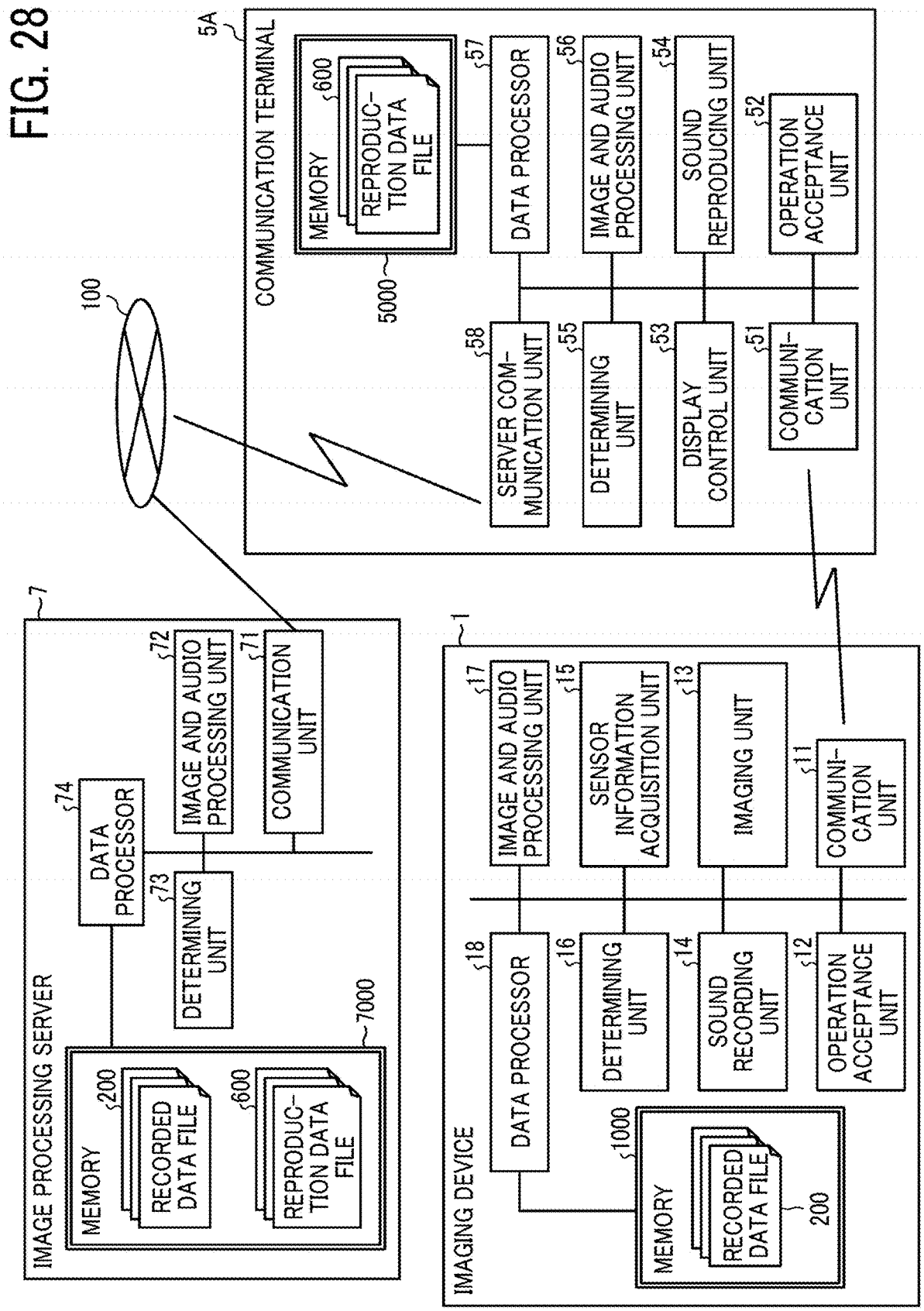
FIG. 28 is a diagram illustrating a functional configuration of an information processing system according to the second embodiment of the present disclosure.

FIG. 28 is a diagram illustrating a functional configuration of an information processing system according to the second embodiment of the present disclosure.

The functions that are implemented by the communication terminal 5A further include a server communication unit 58 in addition to the functions implemented by the communication terminal 5.

The server communication unit 58 is a function to exchange various kinds of data or information with an external device (for example, the external communication terminal 5A or the image processing server 7) through the communication network 100 such as the Internet. The server communication unit 58 is implemented mainly by operations of the long-range communication circuit 511 and the CPU 501 as illustrated in FIG. 10. The server communication unit 58 is an example of a transmission unit.

The functions that are implemented by the image processing server 7 includes a communication unit 71, an image and audio processing unit 72, a determining unit 73, a data processor 74, and a memory 7000.

The communication unit 71 is a function to exchange various kinds of data or information with an external device (for example, an external server or the external communication terminal 5A) through the communication network 100 such as the Internet. The communication unit 71 is implemented mainly by operations of the CPU 701 and the network interface 709 as illustrated in FIG. 27.

The image and audio processing unit 72 is a function to perform various kinds of processing on the various kinds of data transmitted from the communication terminal 5A. The image and audio processing unit 72 is implemented mainly by the instructions sent from the CPU 701 as illustrated in FIG. 27.

The determining unit 73 is a function to perform various kinds of determination and is implemented mainly by operations of the CPU 701 as illustrated in FIG. 27.

The data processor 74 is a function to perform processing to store various types of data in the memory 7000 or read various types of data stored in the memory 7000. The data processor 74 is implemented mainly by operations of the CPU 701 as illustrated in FIG. 27. The memory 7000 is implemented mainly by the ROM 702, the HD 704, and the recording medium 706 as illustrated in FIG. 27. The memory 7000 stores the recorded data file 200 as illustrated in FIG. 12 and the reproduction data file 600 as illustrated in FIG. 14.

A functional configuration of the image and audio processing unit 72 is described below in detail with reference to FIG. 29.

Figure 29:
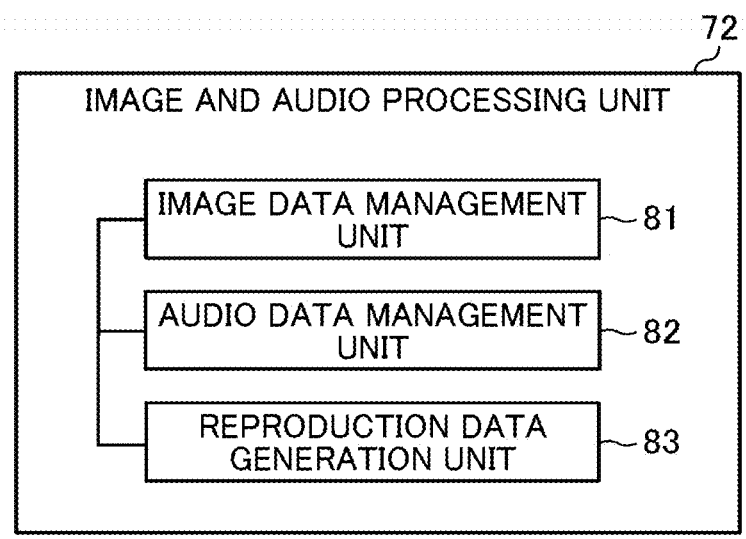
FIG. 29 is a diagram illustrating a detailed functional configuration of an image and audio processing unit according to the second embodiment of the present disclosure.

FIG. 29 is a diagram illustrating a detailed functional configuration of the image and audio processing unit 72 according to the second embodiment of the present disclosure.

The image and audio processing unit 72 includes an image data management unit 81, an audio data management unit 82, and a reproduction data generation unit 83.

The image data management unit 81 is a function to manage, control, and maintain the display range of the spherical image data 210. For example, the image data management unit 81 specifies the position or displaying direction of the cropped image data 610 (an example of two-dimensional image data) included in the spherical image data 210, which is a specific area selected by a user of the communication terminal 5A. The image data management unit 81 is implemented mainly by operations of the CPU 701 as illustrated in FIG. 27. The image data management unit 81 is an example of a displaying direction specification unit.

The audio data management unit 82 is a function to manage, control, and maintain the reproduction audio data 650 that corresponds to the cropped image data 610. The audio data management unit 82 specifies the sound-source direction of the three-dimensional audio data 230 based on the position or displaying direction of the cropped image data 610 specified by the image data management unit 81. The audio data management unit 82 is implemented mainly by operations of the CPU 701 as illustrated in FIG. 27. The audio data management unit 82 is an example of a sound-source direction specification unit.

The reproduction data generation unit 83 is a function to generate the reproduction data file 600 in response to a request sent from the communication terminal 5A, using the recorded data file 200 stored in the memory 7000. For example, the reproduction data generation unit 83 generates the cropped image data 610 from the spherical image data 210, and generates the reproduction audio data 650 based on the three-dimensional audio data 230. The reproduction data generation unit 83 is implemented mainly by operations of the CPU 701 as illustrated in FIG. 27. The reproduction data generation unit 83 is an example of a generation unit.

Operation According to Second Embodiment

A method of generating and reproducing two-dimensional video according to the second embodiment of the present disclosure is described below with reference to FIG. 30.

Figure 30:
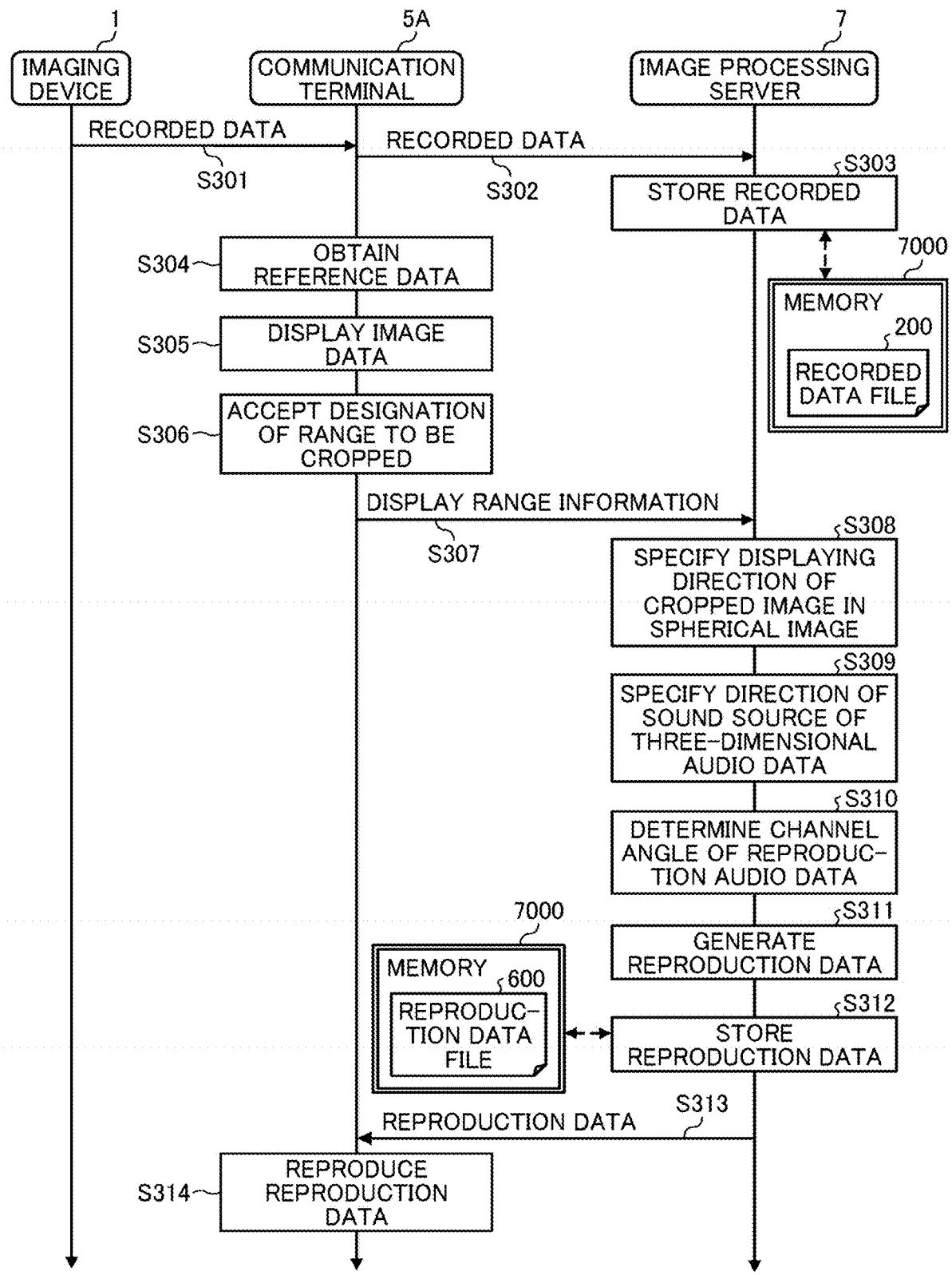
FIG. 30 is a sequence diagram illustrating the generating processes of reproduction data, in the information processing system according to the second embodiment of the present disclosure.

FIG. 30 is a sequence diagram illustrating the generating processes of reproduction data, in the information processing system according to the second embodiment of the present disclosure.

In the step S301, the communication unit 11 of the imaging apparatus 1 transmits the recorded data file 200, which is generated by the image and audio processing unit 17, to the communication terminal 5A, using the short-range radio communication. Note that the recorded data file 200 is generated by the image and audio processing unit 17 adopting the methods as described above with reference to FIG. 15 to FIG. 17E. The recorded data file 200 is the omnidirectional video data recorded by the imaging apparatus 1, and includes the spherical image data 210, the audio data 220, the three-dimensional audio data 230, and the tilt angle data 250 as illustrated in FIG. 12.

In a step S302, the server communication unit 58 of the communication terminal 5A transmits the recorded data file 200 received by the communication unit 51 to the image processing server 7 through the communication network 100.

In a step S303, the data processor 74 of the image processing server 7 controls the memory 7000 to store the recorded data file 200 received by the communication unit 71.

In a step S304, the image and audio processing unit 56 of the communication terminal 5A obtains reference data from the recorded data file 200 received by the communication unit 51. In a step S305, the display control unit 53 of the communication terminal 5A controls the display 517 to display an image (for example, the display screen 6000). In a step S306, the operation acceptance unit 52 of the communication terminal 5A accepts the designation of a range to be cropped made on the display screen 6000. Note that the processes in the steps S304 to S306 are equivalent to the processes in the steps S202 to S204 as illustrated in FIG. 18.

In a step S307, the server communication unit 58 of the communication terminal 5A transmits the display range information of the cropped image 6200 to the image processing server 7 through the communication network 100. The display range information includes the coordinate data of the cropped image 6200. The display range information is an example of direction information. In the step S307, the server communication unit 58 of the communication terminal 5A may transmit the recorded data file 200 that corresponds to the cropped image 6200 to the image processing server 7, together with the display range information of the cropped image 6200. In this case, the processes in the step S302 as illustrated in FIG. 30 may be omitted.

In a step S308, the image data management unit 81 of the image processing server 7 specifies the displaying direction of the cropped image 6200 in the spherical image. The processes in the step S308 are are equivalent to the processes in the step S205 as illustrated in FIG. 18.

In the information processing system according to the second embodiment of the present disclosure, the image data management unit 61 of the communication terminal 5A calculates and obtains the coordinate data of the cropped image 6200 in the step S307. Then, in the step S308, the image data management unit 81 of the image processing server 7 calculates and obtains the center coordinates C(X, Y) of the cropped image 6200, and calculates and obtains the angle θ of the displaying direction of a cropped image using the calculated and obtained coordinate data of the cropped image 6200.

In a step S309, the audio data management unit 82 of the image processing server 7 specifies the sound-source direction of the three-dimensional audio data 230 based on the specified displaying direction of the cropped image 6200. In a step S310, the audio data management unit 82 of the image processing server 7 determines the channel angle of the reproduction audio data 650. In a step S311, the reproduction data generation unit 83 of the image processing server 7 generates reproduction data to be reproduced on the communication terminal 5A. Note that the processes in the steps S309 to S311 are equivalent to the processes in the steps S206 to S208 as illustrated in FIG. 18.

In a step S312, the data processor 74 of the image processing server 7 controls the memory 7000 to store the reproduction data generated by the reproduction data generation unit 83 as the reproduction data file 600. In a step S313, the communication unit 71 of the image processing server 7 transmits the reproduction data generated by the reproduction data generation unit 83 to the communication terminal 5A through the communication network 100. Note that the order of the processes in the steps S312 and S313 may be the other way round. Alternatively, the processes in the steps S312 and S313 may be performed in parallel.

In a step S314, the display control unit 53 and the sound reproducing unit 54 of the communication terminal 5A received by the server communication unit 58 displays the cropped image data 610 included in the reproduction data file 600 and plays back the reproduction audio data 650 included in the reproduction data file 600. As described above, the communication terminal 5A plays back the reproduction data generated by the image processing server 7, on a one-frame-by-one-frame basis. Accordingly, a specific area of the omnidirectional video can be played back as two-dimensional video.

Due to the configurations as described above, the information processing system according to the second embodiment of the present disclosure uses the image processing server 7 to generate the reproduction data. Accordingly, the two-dimensional audio data that is associated with the two-dimensional image data can be generated, while reducing the processing load on the communication terminal 5A.

Modification of Second Embodiment

A modification of the second embodiment of the present disclosure is described below. In the second embodiment of the present disclosure as described above, an example case in which the communication terminal 5A transfers the recorded data transmitted from the imaging apparatus 1 to the image processing server 7 was described. However, when the recorded data file 200 is stored in the memory 5000 of the communication terminal 5A, the communication terminal 5A does not need to transmit the recorded data to the image processing server 7. In this case, the processes in the step S302 as illustrated in FIG. 30 are omitted, and in the processes in the step S307, the audio data 220, the three-dimensional audio data 230, and the tilt angle data 250, which are stored in the recorded data file 200 in a chronological order, are sent from the communication terminal 5A to the image processing server 7 together with the display range information. When the reproduction data is to be played back, the communication terminal 5A can display a selected display range of the recorded data, and can play back the reproduction data (i.e., the reproduction audio data 650) generated by the image processing server 7.

As described above, the communication terminal 5 (an example of an information processing apparatus) according to an embodiment of the present disclosure displays the spherical image data 210 obtained by the imaging apparatus 1, and reproduces the three-dimensional audio data 230 that is obtained in association with the spherical image data 210 that is obtained by the imaging apparatus 1. The communication terminal 5 accepts the designation of a range to be cropped (an example of the designation of a desired displaying direction) on the displayed spherical image. Then, the communication terminal 5 generates the cropped image data 610 (i.e., an example of two-dimensional image data) that corresponds to the range to be cropped 6100 (i.e., an example of the designated displaying direction), from the spherical image data 210, and generates the reproduction audio data 650 (an example of two-dimensional audio data) that corresponds to the range to be cropped 6100, based on the three-dimensional audio data 230. Due to this configuration, the communication terminal 5 the two-dimensional audio data that is associated with the two-dimensional image data can be generated when a certain area of the spherical image is to be displayed as a two-dimensional image.

Moreover, the communication terminal 5 (an example of an information processing apparatus) according to an embodiment of the present disclosure generates two-dimensional video from the omnidirectional video that includes the spherical image data 210 and the three-dimensional audio data 230 recorded by the imaging apparatus 1. The communication terminal 5 accepts the designation of a range to be cropped (an example of the designation of a certain area) on the omnidirectional video. Then, the communication terminal 5 generates the cropped image data 610 (i.e., an example of two-dimensional image data) that corresponds to the range to be cropped 6100 (i.e., an example of the designated area), from the omnidirectional video, and generates the reproduction audio data 650 (an example of two-dimensional audio data) that corresponds to the range to be cropped 6100, based on the three-dimensional audio data 230. Due to this configuration, the communication terminal 5 can generate the two-dimensional audio data that is associated with the two-dimensional image data when a certain area of the omnidirectional video is to be played back as two-dimensional video.

Further, the communication terminal 5 (an example of an information processing apparatus) according to an embodiment of the present disclosure using the reproduction audio data 650 (an example of two-dimensional audio data) and the cropped image data 610 (i.e., an example of two-dimensional image data) generates the reproduction data (an example of two-dimensional video), and stores the generated reproduction data. Then, the communication terminal 5 reproduces the stored reproduction data. Due to this configuration, when a certain area of the omnidirectional video is to be played back as two-dimensional video, the communication terminal 5 can reduce the sense of awkwardness that a user may feel by reproducing the two-dimensional audio data that is associated with the two-dimensional image data.

Moreover, the communication terminal 5 (an example of an information processing apparatus) according to an embodiment of the present disclosure specifies the range to be cropped 6100 (i.e., an example of the designated area) in the omnidirectional video. Then, the communication terminal 5 specifies the sound-source direction of the three-dimensional audio data 230 included in the omnidirectional video, based on the specified position of the range to be cropped 6100, and generates the reproduction audio data 650 (an example of two-dimensional audio data) that corresponds to the range to be cropped 6100, based on the specified sound-source direction and the three-dimensional audio data 230. Due to this configuration, when a certain area of the omnidirectional video is to be played back as two-dimensional video, the communication terminal 5 can generate the two-dimensional audio data of the sound-source direction that corresponds to the position of the two-dimensional image data.

The three-dimensional audio data 230 according to an embodiment of the present disclosure is stereophonic sound data generated based on an Ambisonics B-format. Accordingly, the communication terminal 5 (i.e., an example of an information processing apparatus) can generate the two-dimensional audio data that is associated with the two-dimensional image data, using parameters of the three-dimensional audio data 230 included in the omnidirectional video.

The information processing system according to an embodiment of the present disclosure includes the communication terminal 5A (an example of an information processing apparatus) that displays the spherical image data 210 obtained by the imaging apparatus 1 and reproduces the three-dimensional audio data 230 that is obtained in association with the spherical image data 210 that is obtained by the imaging apparatus 1, and the image processing server 7 (an example of an external device) coupled to the communication terminal 5A through a communication network. The communication terminal 5A accepts the designation of a range to be cropped (an example of the designation of a desired displaying direction) on the displayed spherical image, and transmits the three-dimensional audio data 230 and the display range information (an example of direction information) indicating the range to be cropped 6100 (an example of the designated displaying direction) to the image processing server 7. Then, the image processing server 7 generates the reproduction audio data 650 (an example of two-dimensional audio data) that corresponds to the range to be cropped 6100, based on the three-dimensional audio data 230. Due to this configuration, the information processing system according to an embodiment of the present disclosure uses the image processing server 7 to generate the two-dimensional audio data. As a result, the two-dimensional audio data that is associated with the two-dimensional image data can be generated, while reducing the processing load on the communication terminal 5A.

Further, the information processing system according to an embodiment of the present disclosure includes the communication terminal 5A (an example of an information processing apparatus) that reproduces the two-dimensional video, which is generated based on the omnidirectional video including the spherical image data 210 and the three-dimensional audio data 230 recorded by the imaging apparatus 1, and the image processing server 7 (an example of an external device) coupled to the communication terminal 5A through the communication network 100. The communication terminal 5A accepts the designation of a range to be cropped (an example of the designation of a certain area) on the omnidirectional video, and transmits the omnidirectional video and the display range information (an example of region data) indicating the range to be cropped 6100 (an example of the designated area) to the image processing server 7. Then, the image processing server 7 generates the cropped image data 610 (i.e., an example of two-dimensional image data) that corresponds to the range to be cropped 6100, from the omnidirectional video, and generates the reproduction audio data 650 (an example of two-dimensional audio data) that corresponds to the range to be cropped 6100, based on the three-dimensional audio data 230. Due to this configuration, the information processing system according to an embodiment of the present disclosure uses the image processing server 7 to generate the two-dimensional video. As a result, the two-dimensional audio data that is associated with the two-dimensional image data can be generated, while reducing the processing load on the communication terminal 5A.

A data generation method according to an embodiment of the present disclosure is performed by the communication terminal 5 (an example of an information processing apparatus) that displays the spherical image data 210 obtained by the imaging apparatus 1 and reproduces the three-dimensional audio data 230 that is obtained in association with the spherical image data 210 that is obtained by the imaging apparatus 1. The data generation method includes a step of accepting the designation of a range to be cropped (an example of the designation of a desired displaying direction) on the displayed spherical image, a step of generating the cropped image data 610 (i.e., an example of two-dimensional image data) that corresponds to the range to be cropped 6100 (i.e., an example of the designated displaying direction), from the spherical image data 210, and a step of generating the reproduction audio data 650 (an example of two-dimensional audio data) that corresponds to the range to be cropped 6100, based on the three-dimensional audio data 230. According to the data generation method according to such an embodiment of the present disclosure, the two-dimensional audio data that is associated with the two-dimensional image data can be generated when a certain area of the spherical image is to be displayed as a two-dimensional image.

A video generation method according to a modification of an embodiment of the present disclosure is executed by the communication terminal 5 (i.e., an example of an information processing apparatus) that generates two-dimensional video from the omnidirectional video that includes the spherical image data 210 and the three-dimensional audio data 230 recorded by the imaging apparatus 1. The video generation method includes a step of accepting the designation of a range to be cropped (an example of the designation of a certain area) on the omnidirectional video, a step of generating the cropped image data 610 (i.e., an example of two-dimensional image data) that corresponds to the range to be cropped 6100 (i.e., an example of the designated area), from the omnidirectional video, and a step of generating the reproduction audio data 650 (an example of two-dimensional audio data) that corresponds to the range to be cropped 6100, based on the three-dimensional audio data 230. Due to this configuration, according to the video generation method according to an embodiment of the present disclosure, the two-dimensional audio data that is associated with the two-dimensional image data can be generated when a specific area of the omnidirectional video is to be played back as two-dimensional video.

The functional units according to the embodiments of the present disclosure may be implemented by a computer-executable program written by legacy programming language or object-oriented programming language such as assembler language, C language, C++ language, C# language, and Java (registered trademark), and the program can be distributed via telecommunication line.

Moreover, the program that implements the functional units according to the embodiments of the present disclosure may be distributed upon being written on a computer-readable recording medium such as ROM, electrically erasable and programmable read only memory (EEPROM), electrically programmable read only memory (EPROM), flash memory, flexible disk (FD), compact disc read only memory (CD-ROM), compact disc rewritable (CD-RW), digital versatile disk (DVD)-ROM, DVD-RAM, DVD-RW, Blu-ray disc, secure digital (SD) card, and magneto-optical disc (MO).

Further, all or some of the functional units according to the embodiments of the present disclosure may be implemented, for example, on a programmable device (PD) such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, hardware description language (HDL), Very High Speed Integrated Circuit Hardware Description Language (VHDL), or Verilog HDL.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus, comprising:
   circuitry configured to
   display a spherical image obtained by an imaging apparatus,
   reproduce three-dimensional audio data, obtained by the imaging apparatus, in association with the spherical image,
   accept designation of a displaying direction on the spherical image,
   generate two-dimensional image data, that corresponds to the displaying direction, based on data of the spherical image and the displaying direction;
   determine a sound-source direction from the three-dimensional audio data based on the displaying direction;
   extract, from the three dimensional audio data, a left channel of audio data that is tilted by an angle θ from the sound-source direction;
   extract, from the three dimensional audio data, a right channel of audio data that is tilted by an angle −θ from the sound-source direction; and
   generate two-dimensional audio data, that corresponds to the displaying direction, from the left channel of audio data and the right channel of audio data.

2. The information processing apparatus according to claim 1, further comprising:
   a memory configured to store the two-dimensional image data and the two-dimensional audio data, wherein
   the circuitry reproduces the two-dimensional image data and the two-dimensional audio data stored in the memory.

3. The information processing apparatus according to claim 2, wherein
   the circuitry generates two-dimensional video based on the two-dimensional audio data and the two-dimensional image data,
   the memory stores the two-dimensional video, and
   the circuitry reproduces the two-dimensional video stored in the memory.

4. The information processing apparatus according to claim 1, wherein the three-dimensional audio data is stereophonic sound data generated based on an Ambisonics B-format.

5. An information processing system, comprising:
   an image processing server; and
   an information processing apparatus connected to the image processing server through a communication network, the information processing apparatus comprising first circuitry configured to
   display a spherical image obtained by an imaging apparatus; and
   reproduce three-dimensional audio data obtained by the imaging apparatus in associated with the spherical image;
   accept designation of a displaying direction on the spherical image, and
   transmit the three-dimensional audio data and direction information indicating the displaying direction to the image processing server, wherein
   the image processing server includes second circuitry configured to
   determine a sound-source direction from the three-dimensional audio data based on the displaying direction;
   extract, from the three dimensional audio data, a left channel of audio data that is tilted by an angle θ from the sound-source direction;
   extract, from the three dimensional audio data, a right channel of audio data that is tilted by an angle −θ from the sound-source direction; and
   generate two-dimensional audio data, that corresponds to the displaying direction, based on the three-dimensional audio data and the displaying direction.

6. The information processing system according to claim 5, wherein
   the first circuitry of the information processing apparatus transmits the three-dimensional audio data, the direction information, and data of the spherical image to the image processing server, and
   the second circuitry of the image processing server generates two-dimensional image data that corresponds to the displaying direction, based on the data of the spherical image, and generates two-dimensional audio data that corresponds to the displaying direction, from the three-dimensional audio data.

7. A method of generating data, the method comprising:
   displaying a spherical image obtained by an imaging apparatus;
   reproducing three-dimensional audio data obtained by the imaging apparatus in association with the spherical image;
   accepting designation of a displaying direction on the spherical image;
   generating two-dimensional image data, that corresponds to the displaying direction, based on data of the spherical image and the displaying direction;
   determining a sound-source direction from the three-dimensional audio data based on the displaying direction;

extracting, from the three dimensional audio data, a left channel of audio data that is tilted by an angle θ from the sound-source direction;

extracting, from the three dimensional audio data, a right channel of audio data that is tilted by an angle −θ from the sound-source direction; and generating two-dimensional audio data, that corresponds to the displaying direction, from the left channel of audio data and the right channel of audio data.

8. A computer-readable non-transitory recording medium storing a program for causing a computer to execute the method according to claim 7.

* * * * *